(12) United States Patent
Mohr et al.

(10) Patent No.: US 7,861,269 B1
(45) Date of Patent: Dec. 28, 2010

(54) EPG DATA

(75) Inventors: Grant Mohr, San Bruno, CA (US);
Steven Wasserman, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 2097 days.

(21) Appl. No.: 10/654,300

(22) Filed: Sep. 3, 2003

(51) Int. Cl.
*H04N 5/445* (2006.01)
*G06F 13/00* (2006.01)
*G06F 3/00* (2006.01)

(52) U.S. Cl. .............................. 725/48; 725/39; 725/50

(58) Field of Classification Search ............. 725/37–61; 707/104.1
See application file for complete search history.

(56) References Cited

U.S. PATENT DOCUMENTS

| 5,111,398 | A | * | 5/1992 | Nunberg et al. | ................. | 704/9 |
| 5,576,755 | A | * | 11/1996 | Davis et al. | .................. | 725/48 |

OTHER PUBLICATIONS

Baldwin, et al.; "Table Arrangement of Sorted EPG Data to Facilitate Searching on Low Resource Clients"; U.S. Appl. No. 10/061,813; filed Jan. 31, 2002.
Shield, et al.; "Program Guide Data Compression", U.S. Appl. No. 10/185,967; filed Jun. 27, 2002.

\* cited by examiner

*Primary Examiner*—Hunter B. Lonsberry
(74) *Attorney, Agent, or Firm*—Lee & Hayes, PLLC

(57) ABSTRACT

In one implementation, a method is described that may include applying at least one of a capitalization rule and a spacing rule to a word obtained from compressed electronic program guide (EPG) data. The compressed EPG data includes a plurality of word encoding values and a plurality of character encoding values. Each of the capitalization and spacing rules may be based on an arrangement, in the compressed EPG data, of one said word encoding value that references the obtained word with respect to one or more character encoding values. The capitalization and spacing rules may also be based on an arrangement, in the compressed EPG data, of one word encoding value that references the obtained word with respect to at least one other word encoding value. An output is made of the obtained word to which there has been applied at least one of the capitalization rule and the spacing rule.

22 Claims, 19 Drawing Sheets

List of Words Sorted by Memory Space Occupied

| Occurrences Size | | Words | Occurrences Size | | Words | Occurrences Size | | Words |
|---|---|---|---|---|---|---|---|---|
| 56 | 8 | minutes | 8 | 4 | brighter | 5 | 1 | while |
| 35 | 5 | raymond | 8 | 1 | focusing | 5 | 1 | woman |
| 32 | 8 | 2002 | 8 | 1 | promises | 4 | 4 | a |
| 32 | 8 | kqzx | 8 | 2 | quiz | 4 | 2 | as |
| 30 | 15 | 30 | 7 | 1 | accuses | 4 | 1 | find |
| 28 | 4 | frasier | 7 | 1 | amusing | 4 | 1 | life |
| 24 | 8 | may | 7 | 1 | finally | 4 | 2 | of |
| 18 | 2 | everybody | 7 | 1 | garbage | 4 | 2 | on |
| 16 | 2 | jeopardy | 7 | 1 | perfect | 4 | 1 | only |
| 16 | 2 | national | 7 | 1 | romance | 4 | 1 | over |
| 16 | 4 | news | 6 | 6 | 6 | 4 | 1 | ride |
| 16 | 2 | question | 6 | 1 | change | 4 | 1 | side |
| 14 | 4 | classic | 6 | 3 | is | 4 | 1 | wife |
| 12 | 4 | 00p | 6 | 1 | police | 4 | 1 | with |
| 12 | 4 | 30p | 6 | 1 | Robert | 3 | 1 | her |
| 12 | 2 | and | 6 | 1 | snooty | 3 | 1 | him |
| 12 | 3 | answer | 6 | 3 | to | 3 | 1 | job |
| 12 | 3 | show | 5 | 1 | along | 3 | 1 | man |
| 12 | 2 | that | 5 | 1 | being | 3 | 1 | not |
| 12 | 4 | the | 5 | 1 | debra | 3 | 1 | out |
| 10 | 3 | loves | 5 | 1 | frets | 3 | 1 | roz |
| 10 | 1 | world | 5 | 1 | hosts | 3 | 1 | she |
| 9 | 1 | his | 5 | 1 | image | 3 | 1 | try |
| 9 | 4 | pessimist | 5 | 1 | jokes | 2 | 2 | 8 |
| 9 | 8 | therapist | 5 | 1 | meets | 2 | 1 | ex |
| 8 | 4 | 0 | 5 | 1 | party | 2 | 1 | he |
| 8 | 8 | 3 | 5 | 1 | staff | 2 | 1 | it |
| 8 | 1 | 31 | 5 | 1 | takes | 2 | 1 | so |
| 8 | 1 | 7 | 5 | 1 | total | 2 | 1 | to |
| | | | | | | 1 | 1 | s |

Fig. 4

EPG DATA

TECHNICAL FIELD

The present invention generally relates to electronic program guides and more particularly to compression, decompression, keyword searching and event identifiers utilized with respect to electronic program guide (EPG) data.

BACKGROUND

Viewers have access to an ever-increasing amount of television programming due to a growing variety of television programs and an increasing number of broadcast channels. Although the amount of television programming has increased, viewers may encounter difficulties in accessing desired television programs. For example, it may be inconvenient for a viewer to locate a desired television program due to the number of broadcast channels that are available to the viewer. Therefore, the viewer may miss the desired television program.

An electronic program guide (EPG) may be supplied to improve the viewer's experience with television programs. The EPG may enable the viewer to observe a listing of television programs that are currently being broadcast, as well as a listing of television programs that will be broadcast in the future. Additionally, the EPG may allow the viewer to navigate to a television program from the EPG itself. To provide additional information to the viewer, the EPG may include one or more television program characteristics that describe a television program in the EPG. The television program characteristics may include title, broadcast time, broadcast channel, duration, description of the television program, a rating for the television program (e.g., G, PG, PG13, R, etc.), the principle protagonist, and so on.

EPG data is used to construct an EPG. EPG data may be generated by an EPG provider from data obtained from a publisher of the television programming. The data is generally transmitted to the EPG provider from the publisher using a national guide feed. The national guide feed is provided over a high bandwidth connection from the publisher to a head end of the EPG provider, and generally includes a large amount of data. A connection is also provided between the head end and a client device such that the client device may receive EPG data generated by the EPG provider. The connection between the head end and the client device, however, may have a significantly lower bandwidth than the bandwidth of the national guide feed provided between the head end and the publisher. Additionally, because the EPG data is stored in memory of the client device, the amount of EPG data that can be stored at the client device is dependent upon the memory of the client device. If the client device is a low-resource client device, meaning the client device has limited memory, the amount of memory reserved for EPG data and the availability of that memory to provide other functionality is limited.

Therefore, there is a continuing need to improve EPG data, such as to improve compression and decompression of the EPG data to conserve memory resources and improve the interaction of client devices with compressed EPG data.

SUMMARY

Techniques for compressing, decompressing and interacting with electronic program guide (EPG) data are described. In one implementation, a word table is generated which includes words that are included in EPG data. The words are indexed in the word table using word encoding values. The word table may then be used to compress and decompress EPG data by replacing words with word encoding values or replacing word encoding values with words, respectively. Single characters and collections of characters that are not included in the word table may be encoded using a character encoding scheme. In another implementation, EPG data may be further compressed by applying capitalization and spacing rules. The application of capitalization and spacing rules may be based on one or more arrangements of the word encoding values in the compressed EPG data.

In a further implementation, keyword searches on compressed EPG data are based on whether the keyword is encoded as a word encoding value or a character encoding value(s). In this way, fewer encoding values in the compressed EPG data are examined, thereby improving the efficiency of the keyword search. In an additional implementation, event numbering may also be provided to further reduce the amount of memory utilized to store EPG data. Event identifiers may be assigned to each of the television programs in EPG data that are valid for a predetermined amount of time, such as 36 hours, rather than utilizing an identifier for each television program that has been broadcast or will be broadcast. In this way, the event identifiers may utilize a fewer amount of bits, thereby reducing the amount of memory used to store the EPG data. The event identifiers may also be configured to provide for increased functionality of the client device when interacting with the EPG data. For example, the event identifiers may be configured to increase the speed of searches performed using the event identifiers, thereby enabling an EPG application that utilizes the event identifiers to perform faster.

BRIEF DESCRIPTION OF THE DRAWINGS

FIG. 4 shows an exemplary list of the words from the exemplary EPG data of FIG. 3, where the words have been sorted according to which of the words occupy the most memory space when maintained within a memory.

DETAILED DESCRIPTION

Overview

Figure 1:
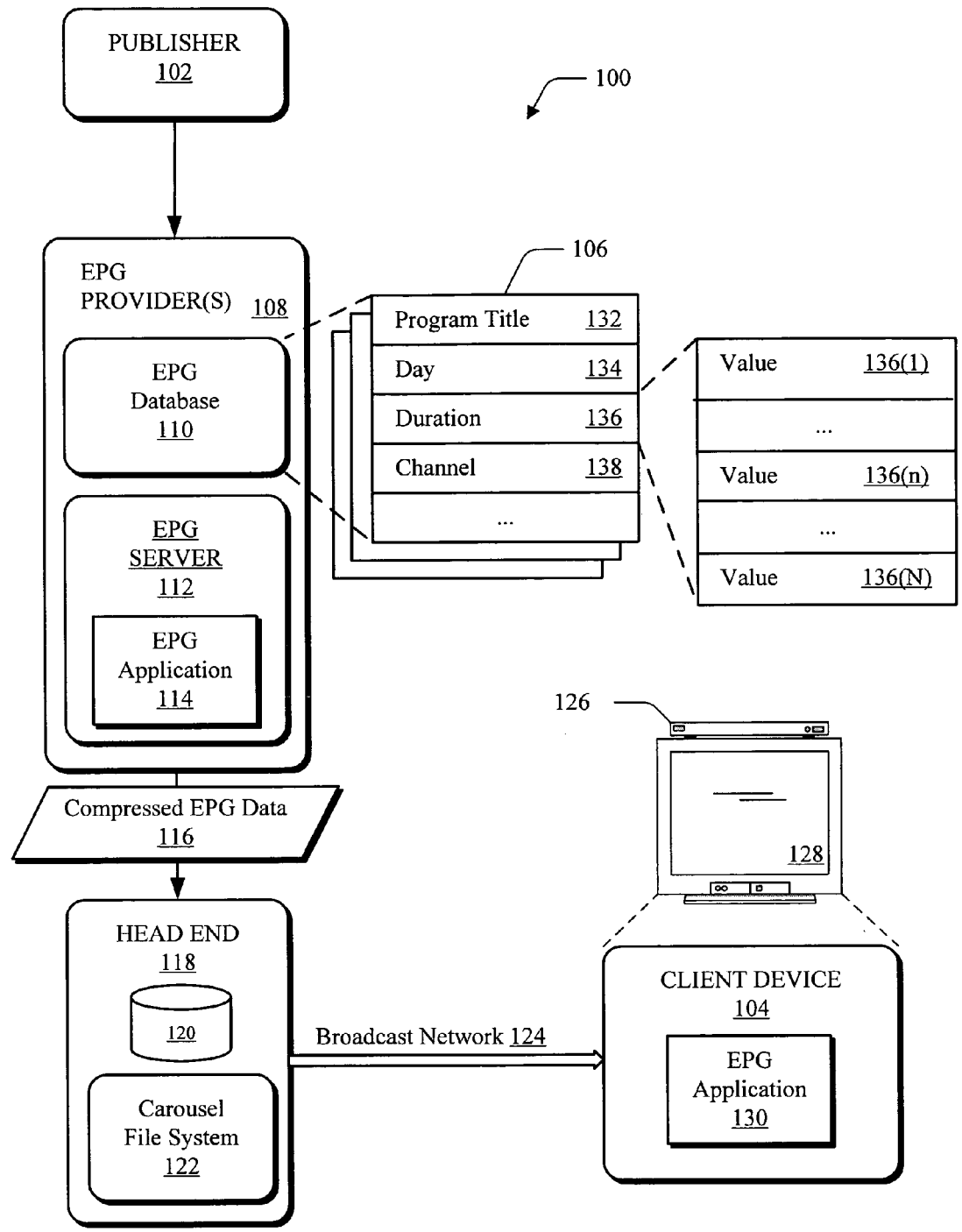
FIG. 1 is an illustration showing a television entertainment system that includes a publisher and a client device.

Compression, decompression and interaction with electronic program guide (EPG) data are described. Current client devices, such as set-top boxes, may have limited memory space, which restricts the amount of EPG data that may be stored on the set-top box and displayed to a viewer using an EPG. To increase the amount of EPG data that may be stored and/or the amount of other data that may be stored on the client device, the EPG data may be compressed. In one example, a compression technique is disclosed, implementations of which combine character compression and word compression to enable a low-resource set-top box to display a greater number of listings. First, a character compression technique recognizes common character combinations that can be stored to compress EPG data. An EPG server may generate a compression table by examining the EPG data that will be sent to a client device and find the most common sets of characters that occur together in the collection of strings in the sample. The common set of characters may then be represented with character encoding values that represent those characters. The compression technique then generates the compression table, and compresses the EPG data that will be transmitted to the client. A word compression technique may also be applied which recognizes commonly used words in the EPG data. The EPG server analyzes the words in the EPG data and creates a word table that includes the most common words that contain three or more characters. The common set of words may then be represented with word encoding values that represent those words. To increase the overall compression ratio in combining the character and word compression techniques, the word compression technique may include words containing three or more characters in the word table, and leave the two character words to be addressed by the character compression technique. Therefore, the compressed EPG data may include both word encoding values that reference words and character encoding values that identify one or more characters.

EPG data may be further compressed by applying capitalization and spacing rules to reduce the number of character encoding values in the EPG data. For instance, spacing rules may be applied to remove character encoding values that identify spaces in the compressed EPG data. Capitalization rules may be applied so that separate character encoding values are not needed to represent capital letters. Further discussion of capitalization and spacing rules may be found in the "Compressing EPG Data through use of Capitalization and Spacing Rules" section below.

Additional functionality may also be provided when interacting with compressed EPG data through use of the word encoding values and the character encoding values. In one implementation, keyword searches on compressed EPG data are performed based on whether the keyword is a word encoding value or a character encoding value(s). Thus, when the compressed EPG data is searched, either the word encoding values or the character encoding values are examined. In this way, fewer encoding values in the compressed EPG data may be examined to find the keyword. Further discussion may be found at the "Keyword Searches of Compressed EPG Data" section below.

EPG data received by the EPG provider from a publisher may include identifiers assigned to each television program. These identifiers are used to identify a particular television program, such as a particular episode. Because there are a vast number of television programs that have been broadcast and that will be broadcast, each of the identifiers may become quite large to distinguish the value from the values of all the other television programs. Therefore it may take a large amount of memory to store all of the identifiers which identify television programs described in EPG data. To decrease the amount of memory used to store these values, event identifiers may be assigned to each of the television programs in EPG data that are valid for a predetermined amount of time. For example, the predetermined amount of time may correspond to the amount of broadcast time described by the EPG data, such as 36-hours, a week, two weeks, and so forth. In this way, the event identifiers assigned to each of the television programs may be smaller, e.g. have fewer bits, than the identifier utilized by the publisher, thereby reducing the amount of memory used to store the EPG data on both the EPG server and the client device. Further, the event identifiers may be configured to increase the functionality of the client device when interacting with the EPG data. For example, the event identifiers may be configured to increase the speed of searches performed using the event identifiers. A further discussion of event identifiers may be found in the "Event Identifiers" section below.

EPG data may be provided in television entertainment systems, such as interactive television networks, cable networks that utilize EPGs, and Web-enabled television networks. Client devices in such systems range from full resource clients with substantial memory and processor resources (e.g., television enabled personal computers, television recorders equipped with hard disk) to low-resource client devices with limited memory and/or processing resources (e.g., traditional set-top boxes). While aspects of the system and methods described below may be used in any of these systems and for any type of client device, they are particularly well suited for system with low-resource client devices. Hence, portions of the following discussion describe the client devices, EPG servers, and methods in the context of a low-resource environment.

Television Entertainment System

FIG. 1 is an illustration showing a television entertainment system 100 that includes a publisher 102 and a client device 104. The publisher 102 creates EPG data 106 for distribution to the client device 104. One example of a publisher 102 is Tribune Media Services of Chicago, Ill., which generates EPG data for interactive television networks. As used herein, EPG data refers to a type of data that might be used to construct an EPG. EPG data includes television program characteristics (characteristics) of television programs broadcast by a content provider. The characteristics may include program titles, ratings, description, lead protagonist's name, year made, station call letters, time schedules, channel numbers, and so on. Each of the characteristics has a corresponding value, such as "Everybody Loves Raymond" for the characteristic "program title."

The EPG data 106 is transferred as an electronic file from the publisher 102 to an EPG provider 108. As one example, the EPG data 106 is transferred using a file transfer protocol (FTP) over a TCP/IP network (e.g., Internet, Intranet, etc.) to the EPG provider 108. The EPG data 106 is stored in an EPG database 110 at the EPG provider 108.

The original version of the EPG data 106 contains all of the programming information for multiple days. An EPG server 112 resides at the EPG provider 108 to process the EPG data 106. The EPG server 112 processes the EPG data 106 by executing an EPG application 114. The processing involves one or more techniques to condition the EPG data 106 so that the client device 104 may handle the EPG data 106 more effectively. The client device 104 may be configured in a variety of ways, such as a set-top box. Additionally, the client device 104 may be configured as a low-resource client device that is typically characterized as having limited memory and/or processing resources. Such a client device 104 may not be able to store the entire original version of the EPG data 106. With limited resources at the client device 104, the processes performed by executing the EPG application 114 by the EPG server 112 are helpful to precondition the EPG data 106 into a more suitable form for storage and processing at the client device 104.

Among other processes, the EPG server 112, when executing the EPG application 114, is configured to reduce the amount of EPG data 106 so that it can be stored at the client device 104 even if the client device 104 has limited resources. For example, the EPG server 112 may compress the EPG data 106 prior to its distribution by using the EPG application 114. The EPG application 114 may be implemented as software that is used to compress the EPG data 106 for communication to the client device 104.

The EPG server 112 provides compressed EPG data 116 formed from the EPG data 106 to a head end 118 for storage in a database 120 of the head end 118. A carousel file system 122 repeatedly broadcasts the compressed EPG data 116 over an out-of-band (OOB) channel to the client device 104 over a broadcast network 124. Distribution from the head end 118 to the client device 104 may be accommodated in a number of ways, including cable, RF, microwave, and satellite. Although the head end 118 is illustrated as separate from the EPG provider 108, the EPG provider 108 may also include the head end 118 and the EPG server 112. Additionally, the EPG server 112 may be included as part of the publisher 102 that provides the EPG data 106.

In the illustrated implementation, the client device 104 is implemented as a set-top box 126 connected to a display device 128. The client device 104 is often equipped with sufficient processing and storage capabilities to store and run an operating system and a few programs. Examples of programs stored on the client device 104 might include a Web browser, a personal scheduler, and so forth. Although the set-top box 126 is shown separately from the display device 128, they may alternatively be built into the display device 128 as integral units. Furthermore, in other implementations, the client device 104 may be embodied as other devices capable of handling EPG data, such as a broadcast-enabled computer, an information appliance, or the like. The client device 104 may include an EPG application 130 that is used to interact with compressed EPG data 116 obtained from the EPG server 112. For example, the EPG application 130 may be used to construct an EPG from the compressed EPG data 116, decompress the compressed EPG data 116, perform a keyword search in the compressed EPG data 116, and so forth. An additional discussion of the client device 104 may be found in relation to FIGS. 20-21.

EPG data 106 stored at the EPG database 110 may include a variety of characteristics 132-138 that describe television programs. For example, the characteristics may include program title 132, day 134 the television program is to be broadcast (i.e. Sunday), duration 136 of the broadcast of the television program, channel 138 the television program will be broadcast on, and so forth. Additionally, each of the characteristics 132-138 may have a plurality of values. For example, television programs that are broadcast by a content provider may have different values 136(1), . . . , 136($n$), . . . 136(N) for the duration 136 characteristic. Additionally, a value may describe a binary condition for a characteristic, such as whether the television program contains or does not contain the characteristic, such as adult language or violence.

Figure 2:
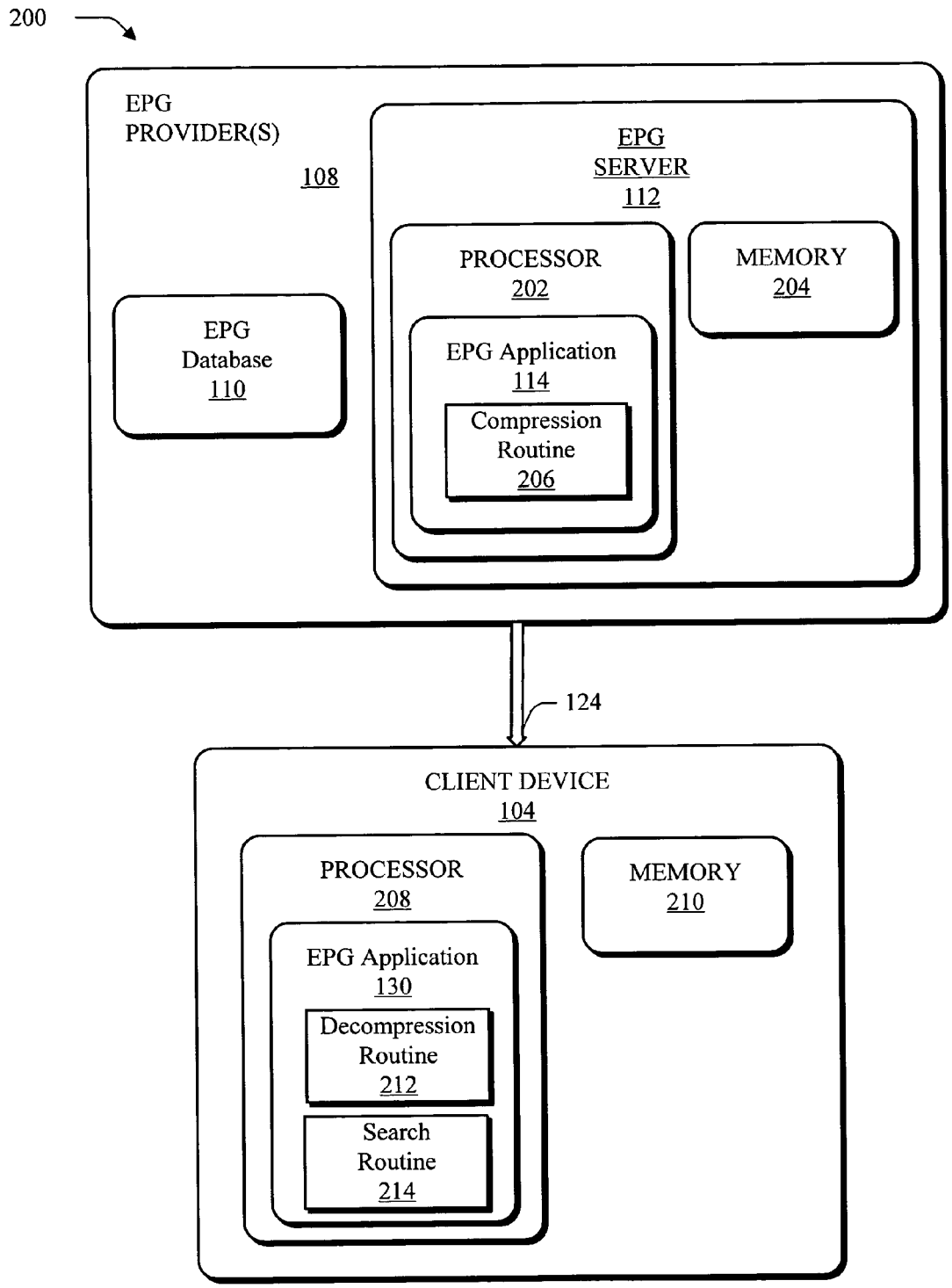
FIG. 2 is an illustration of an exemplary implementation showing the client device and an EPG server of FIG. 1 in greater detail.

FIG. 2 is an illustration of an exemplary implementation 200 showing the client device 104 and the EPG server 112 of FIG. 1 in greater detail. The EPG provider 108 includes the EPG server 112 and the EPG database 110. The EPG server 112 includes a processor 202 and a memory 204. The EPG application 114, illustrated as being executed on the processor 202, is storable in the memory 204. The EPG application 114 may include a compression routine 206 to compress the EPG data 106 of FIG. 1 to form the compressed EPG data 116. A further discussion of the execution of the compression routine 114 and compression of EPG data may be found in relation to FIGS. 3-10.

The client device 104 includes a processor 208 and a memory 210. The EPG application 130 is storable in the memory 210 and is illustrated as being executed on the processor 208. The EPG application 130 may be used to construct an EPG from EPG data received from the EPG provider 108 over the broadcast network 124. The EPG application 130 may include a decompression routine 212 that, when executed, decompresses the compressed EPG data 116 shown in FIG. 1. The EPG application 130 may also include a search routine 214 to perform a keyword search of the compressed EPG data. A further discussion of decompressing compressed EPG data may be found in relation of FIGS. 3-10. A further discussion of a keyword search through execution of the search routine 214 may be found in relation to FIG. 11. A further discussion of the client device 104 and the EPG provider 108 and EPG server 112 may be found in relation of FIGS. 20-21.

Exemplary EPG Data Compression

Figure 3:
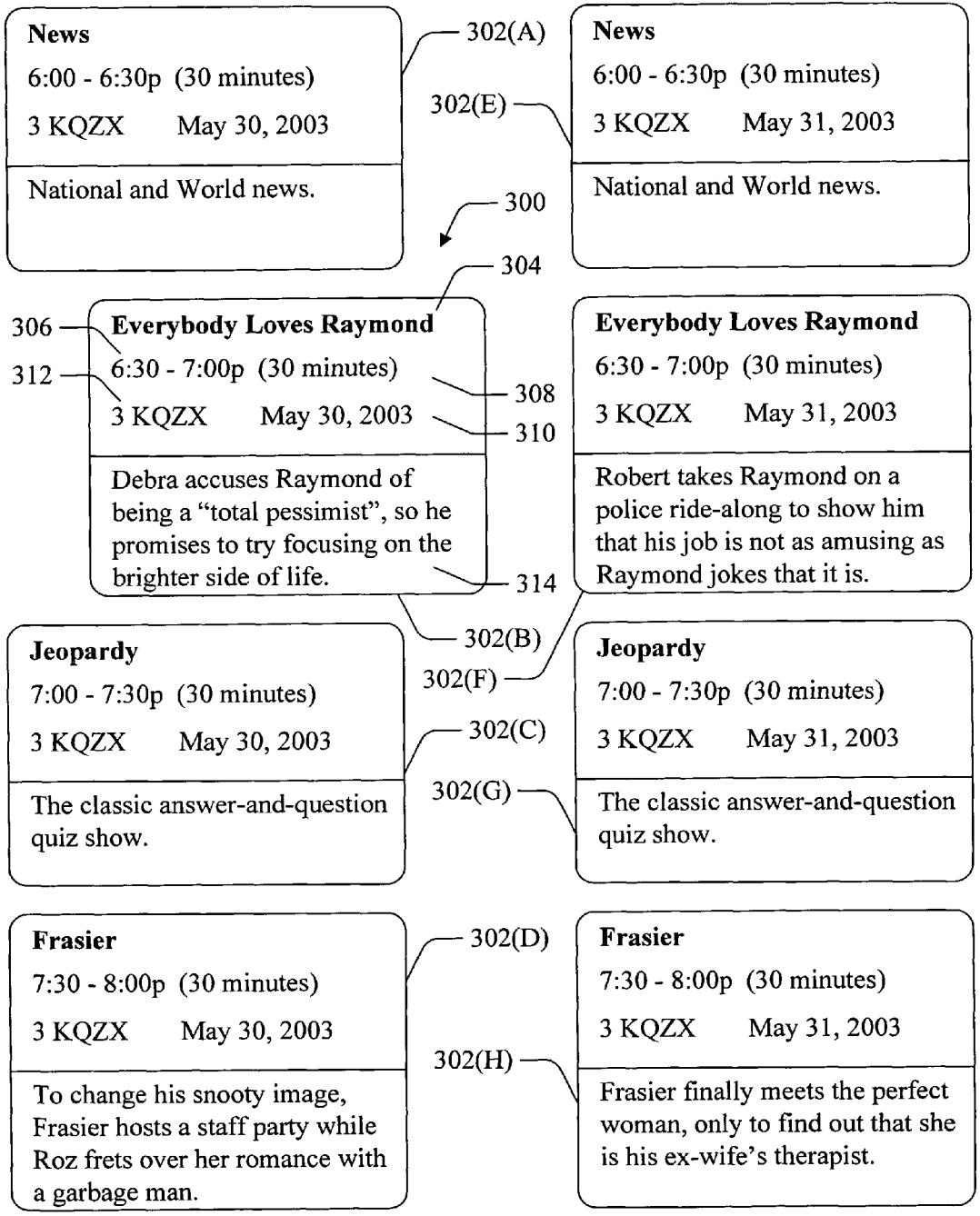
FIG. 3 is shows exemplary EPG data corresponding to a two hour schedule on one broadcast channel for two consecutive days.

FIG. 3 illustrates exemplary EPG data 300 scheduled for two hours (6:00-8:00 p) on one broadcast channel (3 KQZX) for two consecutive days (May 30 and 31, 2003). The EPG data 300 may or may not correspond to the EPG data 106 shown in FIG. 1. The exemplary EPG data 300 is used to illustrate an implementation of EPG data compression with reference to FIGS. 4 through 9. The implementation may be performed through execution of the compression routine 206 included in the EPG application 114 as shown in FIG. 2.

The EPG data 300 for each television program 302(A-H) includes characteristics, such as a program title 304, a program start and stop time 306, a duration 308 of the program, the program broadcast date 310, a channel identification 312 for the television program broadcast, and a program description 314. Each characteristic includes a value which describes the television program, such as "Everybody Loves Raymond" for program title 304. Although not shown, EPG data 300 may also include other related programming information for each television program 302. Implementations of EPG data may include programming information for any number of hours, for one or more days, and/or for one or more weeks.

The EPG data 300 may be maintained in the EPG database 110 shown in FIG. 2. In the example shown in FIG. 3, the EPG data is represented as one or more data strings that are encoded with an eight-bit encoding scheme. For example, the encoding scheme may use ASCII (American Standard Code for Information Interchange) character encoding values. The ASCII encoding scheme uses the character encoding values of 0x20 to 0x7F (hex) to represent alphanumeric characters in the EPG data such as letters and numbers, punctuation marks, and common special characters. A character encoding value 0x00 (hex) represents a null terminator to indicate the end of a data string.

FIG. 4 illustrates a list of the words 400 (to include combinations of numbers and/or letters and numbers) from the example EPG data 300 (FIG. 3) sorted according to which of the words occupy the most memory space when maintained within a memory. The list of words 400 is arranged in three columns that include words 402, a number of occurrences 404 that identifies the number of times that a corresponding word 402 occurs in the EPG data 300, and a size 406. The size 406 represents the total memory space occupied by the corresponding word in the EPG data 300 as determined by a product of the number of times that a word occurs in the EPG data and length of the word.

For example, the word "news" (middle of the first column in the list of words 400) occurs in the EPG data 300 four times as identified by the corresponding "4" occurrences 404. The word "news" appears once each in programs 302(A) and 302(E) (FIG. 3) in the program descriptions "National and World news". A capitalized version of the word "News" also appears once each in the programs 302(A) and 302(E). In this EPG data compression example, a single version of a word is identified in the list of words 400 (FIG. 4). The corresponding size 406 (i.e., the memory space occupied) to maintain four occurrences of the word "news" is "16". The size 406 of "16" is determined by multiplying the number of occurrences of the word by the length of the word (e.g., the number of alphanumeric characters), which in this example is determined by 4×4=16. For an eight-bit encoding scheme such as ASCII, each alphanumeric character is represented in memory with a character encoding value having eight bits (for the English language, but can be represented by more than eight bits for a language other than English). Therefore, sixteen letters (i.e., four each of "n", "e", "w", and "s") are represented in memory with 128 bits, or sixteen bytes (i.e., 16 letters×8 bits each). By not using capital letters, only one occurrence of the word is included in the list of words 400, which may be utilized to include a greater variety and number of words, as will be described in greater detail below in relation to FIG. 5.

The word "minutes" (at the top of the first column in the list of words 400) occupies the most memory space with a size of "56" as determined by eight occurrences of the word in the EPG data 300 multiplied by the seven letter length of the word. The word "minutes" appears once in each of the eight programs 302(A-H) (FIG. 3). It should be noted that the word occurring most often in EPG data 300 is "30" ($5^{th}$ entry in the $1^{st}$ column in the list of words 400) which occurs "15" times, but that "30" does not occupy the most memory space because the word length is only two characters which is equivalent to a size of "30" (i.e., 15 occurrences of the word×2 letters each).

Figure 5:
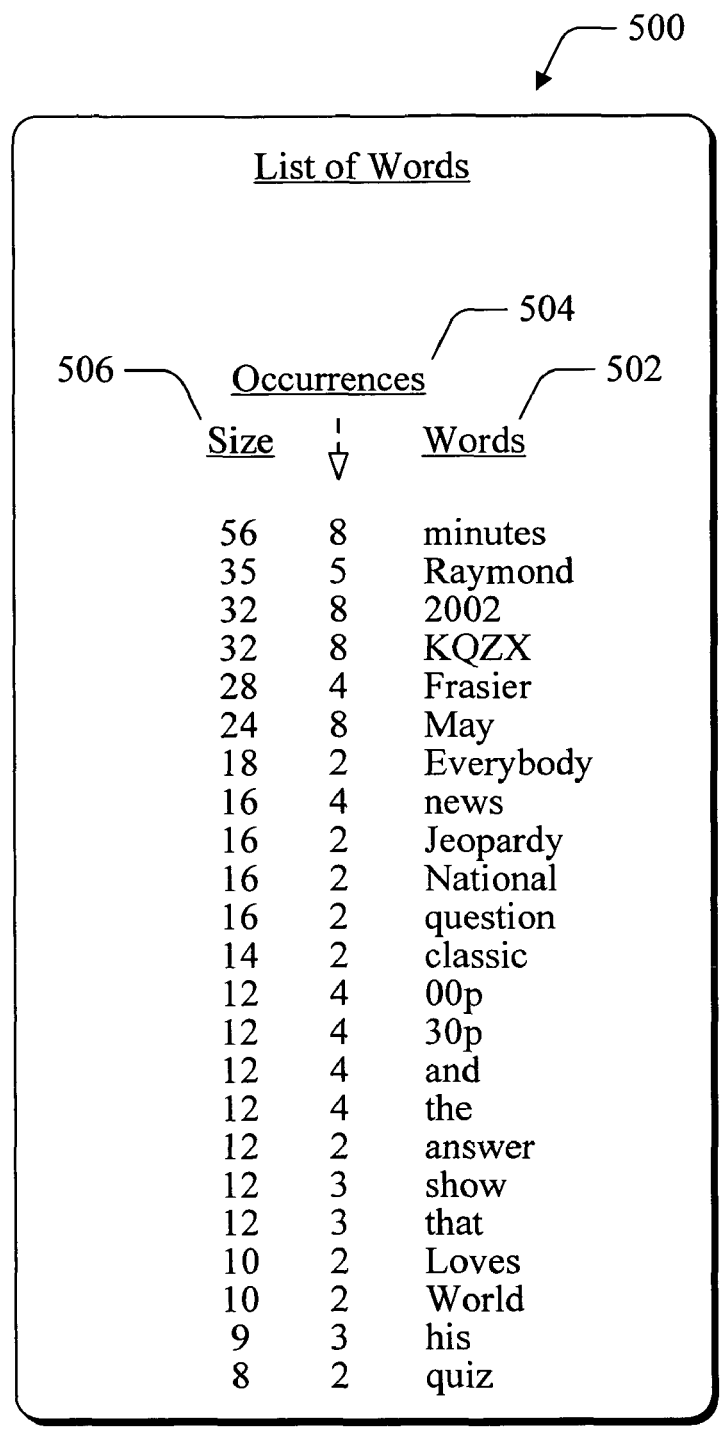
FIG. 5 is an illustration of an exemplary list of words from the exemplary EPG data of FIG. 3 that will be included in a word table.

FIG. 5 illustrates a list of words 500 from the example EPG data 300 that will be included in a table. In this implementation, the list of words 500 are the words 502 that remain from the list of words 400 (FIG. 4) after any words that occur in the EPG data 300 only once are omitted and have two characters or less. In other implementations, words with a single occurrence and/or two character words may also be included. The list of words 500 includes the words 502, a number of occurrences 504 of a corresponding word in the EPG data 300, and a size 506 of the word.

Figure 6:
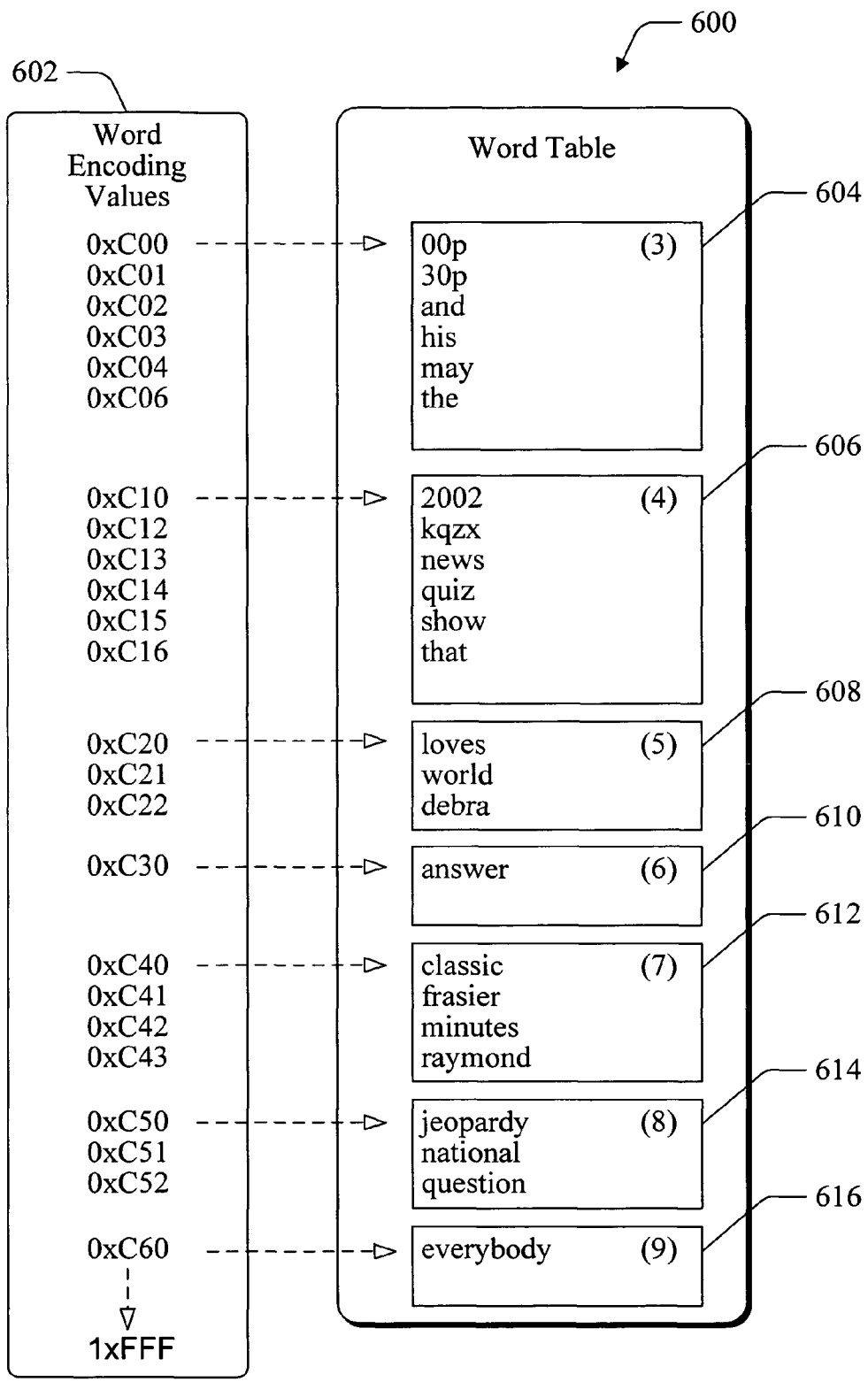
FIG. 6 is an illustration of an exemplary word table that includes the list of words from FIG. 5 from the exemplary EPG data of FIG. 3.

FIG. 6 illustrates a table 600 which includes the list of words 500 from FIG. 5 from the example EPG data 300 of FIG. 3. FIG. 6 also illustrates an index 602 of word encoding values to reference the words included in the word table 600. The list of words 500 are sorted in the word table 600 according to the length of each word such that words 502 of the same length are grouped together alphabetically. Table 600 includes a group 604 of three-letter words, a group 606 of four-letter words, a group 608 of five-letter words, a group 610 of six-letter words, a group 612 of seven-letter words, a group 614 of eight-letter words, and a group 616 of nine-letter words (although in this example, groups 610 and 616 only include one word each). Additionally, each group of words that are the same length is sorted alphabetically within the respective group.

Index 602 includes twelve-bit word encoding values that reference the individual words in the word table 600. The individual word encoding values are generated from a set of word encoding values 0xC00 to 0xFFF (hex). Words that will be included in the word table 600 are the words that occupy the most memory space as described with reference to FIGS. 4 and 5, and thus provide the most compression benefit. Any words from the EPG data that could be included in the table but are omitted because table capacity has been reached will be the words that occupy the least amount of memory space and thus provide the least compression benefit. By including only single versions of the words, i.e. the words are not capitalized, more words may be included in the word table 600 and thus may increase the amount of compression realized when using the word table 600.

Figure 7:
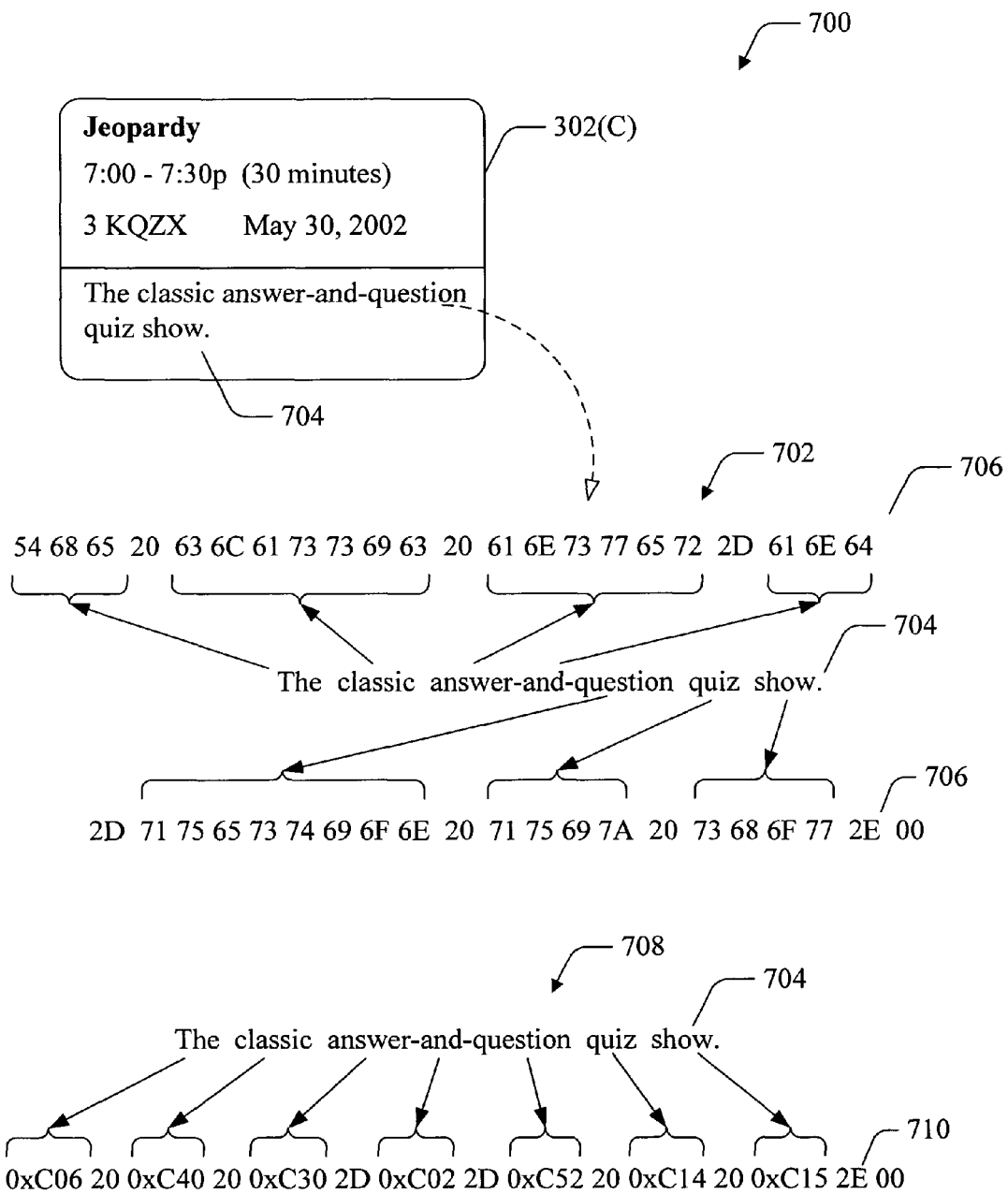
FIG. 7 is an illustration of exemplary EPG data strings and exemplary compressed EPG data strings.

FIG. 7 illustrates examples of EPG data compression. A first example 702 shows ASCII encoding of a portion of the EPG data for program 302(C) (also shown in FIG. 3). Each character of an EPG data string 704 is represented in memory with a character encoding value having eight bits to form a compressed EPG data string 706. The EPG data string 704 is encoded according to the following ASCII character table:

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | nul | soh | stx | etx | eot | enq | ack | bel | bs | ht | lf | vt | ff | cr | so | si |
| 1 | dle | dc1 | dc2 | dc3 | dc4 | nak | syn | etb | can | em | sub | esc | fs | gs | rs | us |
| 2 | sp | ! | " | # | $ | % | & | ' | ( | ) | * | + | , | - | . | / |
| 3 | 0 | 1 | 2 | 3 | 4 | 5 | 6 | 7 | 8 | 9 | : | ; | < | = | > | ? |
| 4 | @ | A | B | C | D | E | F | G | H | I | J | K | L | M | N | O |
| 5 | P | Q | R | S | T | U | V | W | X | Y | Z | [ | \ | ] | ^ | _ |
| 6 | ' | a | b | c | d | e | f | g | h | i | j | k | l | m | n | o |
| 7 | p | q | r | s | t | u | v | w | x | y | z | { | \| | } | ~ | del |

To encode each character of the EPG data string 704 with the ASCII encoding scheme, forty-three (43) character encoding values are used in the compressed EPG data string 706, which is 344 bits.

A second example 708 shows EPG data compression of the EPG data string 704. Rather than using eight bits to represent each character of the EPG data string 704 in memory, word encoding values that reference the words in the word table 600 shown in FIG. 6 are used to compress the EPG data string 704 on a word-by-word basis. The twelve-bit word encoding values that reference the individual words in the word table 600 of FIG. 6 are used to replace the words in the EPG data string 704 to form a compressed EPG data string 710. For example, the twelve-bit word encoding value 0xC40 may be used instead of seven eight-bit character encoding values 63, 6C, 61, 73, 73, 69, 63 (hex). In the second example 708, to encode the example EPG data string 704 into the compressed EPG data string 710 using the word table 600 of FIG. 6, fifteen encoding values are used, including seven word encoding values, which is 148 bits.

As described above, the word "news" appears once each in the program description for programs 302(A) and 302(E) (FIG. 3), and a capitalized version of the word "News" also appears once each in the program title for programs 302(A) and 302(E). Only the non-capitalized versions of the word, however, are included in the word table 600 of FIG. 6. In one implementation, variations of a base word may be identified using the bits of token values which represent the words in a data string. A token value may be a sixteen-bit value, a thirty-two bit value, or any other sized token value. For example, a base word such as "boat" may be included in the word table 600 of FIG. 6 and variations of the word, such as the plural "boats", a capitalized version "Boat", and a capitalized plural version "Boats" can all be represented in compressed EPG data with thirty-two bit values that represent the words in a data string.

If the word "boat" was included in table 600 of FIG. 6, the word would be included in the group 606 of four-letter words and, in alphabetical order, would have a twelve-bit word encoding value "0xC11" which appears between the words "2002" and "kqzx." When the twelve-bit word encoding value is converted to a thirty-two bit value to represent the word "boat" in a data string, the token value can include a bit or bits allocated to indicate variations of the word. For example:

For example:

| Word | Word Encoding Value | Token Value | Indicates |
|---|---|---|---|
| boat | 0xC11 | 0x00000008 | base word |
| Boat | 0xC11 | 0x40000008 | up-case first letter |

-continued

| Word | Word Encoding Value | Token Value | Indicates |
|---|---|---|---|
| boats | 0xC11 | 0x80000008 | concatenate 's' |
| Boats | 0xC11 | 0xC0000008 | up-case first letter & concatenate 's' |
| boat. | 0xC11 | 0x20000008 | concatenate '.' |

This example also illustrates that punctuation may be included in the compression scheme when adding a period ('.') to the base word "boat" and converting the token value to indicate that "boat" is the end of a sentence in the data string (i.e., "boat."). This implementation may include any other punctuation as well, such as "boat/", "boat,", "boat?", and the like.

Compressing EPG Data Through Use of Capitalization and Spacing Rules

In the previous implementation, token values were supplied to indicate capitalization of words referenced by word encoding values in the word table 600. To further compress the EPG data, capitalization and spacing rules may be applied. Capitalization and spacing rules may reduce the number of character encoding values and token values used to indicate spacing and capitalization of words and characters.

Figure 8:
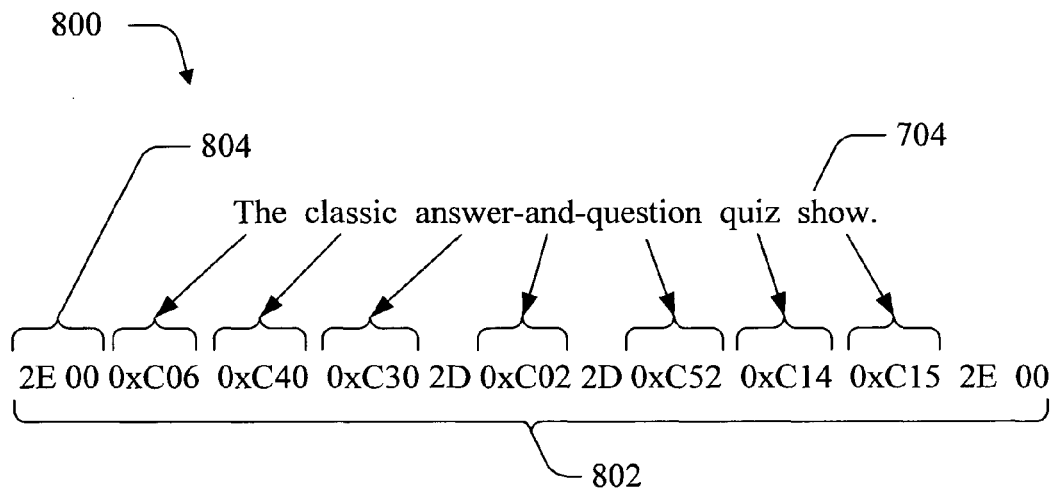
FIG. 8 is an illustration of the exemplary EPG data string of FIG. 7 and an exemplary compressed EPG data string which is formed from the EPG data string.

FIG. 8 is an illustration showing an example 800 of the EPG data string 704 of FIG. 7 and a compressed EPG data string 802 that is formed from the EPG data string 704. As previously stated, to reduce the number of word encoding values used to describe variations of the same word, EPG data may be compressed through execution of the compression routine 206 on the EPG server 112 (FIG. 2) so that capital letters are not used. Therefore, a greater variety and number of words may be included in the word table 600 of FIG. 6 which is used to compress and decompress EPG data. For example, additional words may be included in the word table 600 of FIG. 6 using the same amount memory instead of including multiple versions of the same word.

Capitalization rules may be applied based on arrangement of word encoding values in the compressed EPG data. As shown in the EPG data string 704, the words "the," "classic," "answer," "and," "question," "quiz," and "show" are each encoded using respective word encoding values from the word table 600 of FIG. 6 to form the compressed EPG data string 802. A first capitalization rule may be applied to supply capitalization to a word that is decompressed from the compressed EPG data string 802. The first capitalization rule specifies that if a word encoding value immediately follows a character encoding value that indicates an end of a sentence and/or an end of a previous data string, then a first character included in a word obtained using the word encoding value is capitalized. For example, the word encoding value "0xC06" which references the word "the" follows character encoding values from a previous compressed EPG data string 804. The character encoding values indicate, respectively, the end of a sentence and the end of the previous data string. The character encoding value 00 (hex), which references a "null" value in the ASCII encoding scheme, may indicate the end of the previous compressed EPG data string 804. The end of a sentence may be indicated with a character encoding value 2E (hex) which references a "period" in the ASCII encoding scheme. Character encoding values 21 (hex) and 3F (hex) that reference an exclamation point and a question mark, respectively, may also be utilized to indicate the end of a sentence. When decompressing the compressed EPG data string 802 to output the EPG data string 704, the first capitalization rule is applied. Therefore, when the word "the" (referenced by the word encoding value 0xC06 in the word table 600 shown in FIG. 6) is obtained, the first character of the word "the" is capitalized to form "The" based on the arrangement of the corresponding word encoding value in the compressed EPG data string 802.

Capitalization may also be provided to the first character of a word in a compressed data string in EPG data automatically through use of a second capitalization rule. For example, if a word encoding value is the first encoding value in a compressed EPG data string, the first character in the word referenced by the word encoding value may be automatically capitalized. Therefore, even if the compressed EPG data string 702 did not follow the previous data string 804, the first character of the word "the" would still be capitalized to form "The."

Spacing rules may also be applied to further compress the EPG data. For example, instead of including character encoding values 20 (hex) to indicate spaces between words, as shown in FIG. 7, spacing may be provided through application of spacing rules. The spacing rules, when applied to compressed EPG data, reduce the number of character encoding values that are used to reference spaces in compressed EPG data.

There are a variety of spacing rules that may be applied based on arrangement of word encoding values in compressed EPG data. A first spacing rule specifies that if a word encoding value directly follows another word encoding value, a single space is inserted between words referenced by the word encoding value and the other word encoding value. In other words, when the compressed EPG data string is decompressed, a space is provided automatically between the words that are referenced by the word encoding values.

The compression routine 206 may be executed on the processor 202 of the EPG server 112 shown in FIG. 2 to apply the first spacing rule. The spacing rule may be applied after words and characters in the EPG data string 704 are replaced with word and character encoding values, respectively. For instance, the compressed EPG data string 710 shown in FIG. 7 may be formed using the word table 600 of FIG. 6 and the ASCII character table shown previously in the discussion. The character encoding values 20 (hex) are supplied between the word encoding values. The character encoding values 2D (hex) that reference a "-" in the ASCII encoding scheme are included, respectively, between the word encoding values 0xC30, 0xC02 and between the word encoding values 0xC02, 0xC52.

Through application of the first spacing rule (from execution of the compression routine 206 of the EPG application 114 of FIG. 2), the character encoding values 20 (hex) as shown in example 706 of FIG. 7 are removed when the character encoding value 20 (hex) is directly between two word encoding values. FIG. 8 is an illustration of an exemplary implementation 800 showing a compressed EPG data string 802 formed from the EPG data string 706 of FIG. 7 through application of the first spacing rule. In the compressed EPG data 802, twelve encoding values are used to compress the data string 704 to form the compressed EPG data string 802, which is 116 bits.

The first spacing rule has different aspects when compressing as opposed to decompressing EPG data. When the first spacing rule is utilized to compress EPG data, character encoding values that reference a space are removed when the character encoding value is disposed directly between two word encoding values. When the first spacing rule is used to decompress compressed EPG data, a space is provided automatically between words that are referenced by two word encoding values that are directly adjacent to each other in the compressed EPG data. Both aspects, however, may be thought of as application of the first spacing rule.

Figure 9:
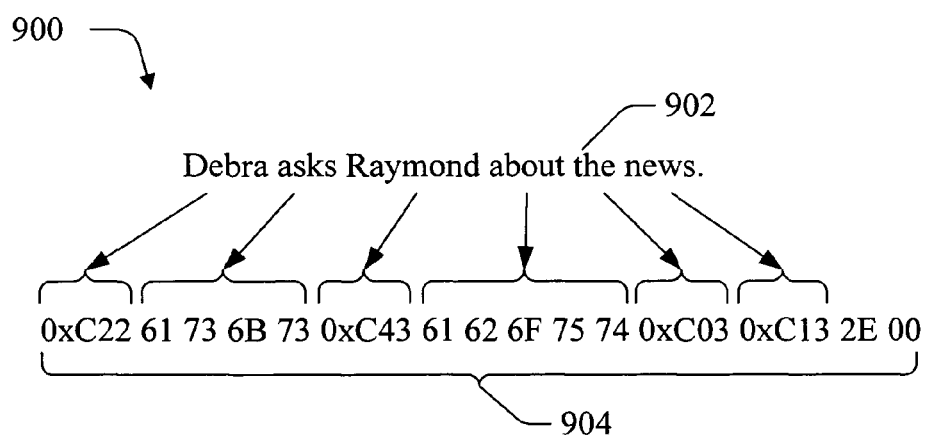
FIG. 9 is an illustration of an exemplary EPG data string and a corresponding compressed EPG data string that is further compressed by application of spacing rules.

FIG. 9 is an illustration showing an example 900 of an EPG data string 902 and a corresponding compressed EPG data string 904 that is compressed by application of spacing rules. The compressed EPG data string 904 is compressed using the word table 600 shown in FIG. 6. Additional spacing rules are provided to further compress EPG data. The additional spacing rules are also based on arrangement of word encoding values in compressed EPG data.

A second spacing rule, when used to decompress compressed EPG data, specifies that if a word encoding value immediately precedes a character encoding value that references a letter or a number, a space is inserted after a word that is referenced by the word encoding value. In other words, a space is inserted between the word that is referenced by the word encoding value and the letter or number that is referenced by the character encoding value. For example, the word encoding value 0xC22 (hex) that references the word "debra" in the word table 600 (FIG. 6) immediately precedes a character encoding value 61 (hex) that references a letter "a" in the ASCII encoding scheme. Therefore, a space is inserted between the letter "a" and the word "debra" when the compressed EPG data string 904 is decompressed. The second spacing rule, when used to compress the EPG data 902, specifies that if a character encoding value that references a space directly follows a word encoding value and directly precedes a character encoding value that references a letter or a number, the character encoding value that references the space is removed to form the compressed EPG data string 904.

A third spacing rule, when used to decompress compressed EPG data, may specify that if a word encoding value directly follows a character encoding value that references a letter or number, a space is inserted before a word that is referenced by the word encoding value and the letter or number that is referenced by the character encoding value. For example, the word encoding value 0xC03 (hex) references the word "the" in the word table 600 (FIG. 6) and follows a character encoding value 74 (hex) that references the letter "t" in the ASCII encoding scheme. Therefore, a space is inserted between the letter "t" and the word "the" when the compressed EPG data string 904 is decompressed. The third spacing rule, when used to compress the EPG data 902, specifies that if a character encoding value that references a space directly precedes a word encoding value and directly follows a character encoding value that references a letter or a number, the character encoding value that references the space is removed to form the compressed EPG data string 904. Additional capitalization and spacing rules that are based on arrangement of word encoding values in compressed EPG data are also contemplated, the previous discussion containing a few examples thereof.

Compression Utilizing Unused Character Encoding Values

In some encoding schemes, the character table used to compress and decompress data has many unused character encoding values. In other words, there are more character encoding values than there are characters to reference. Further, there may be some character encoding values that are not utilized when compressing EPG data. For example, in the ASCII encoding scheme, the values 0x01 to 0x1F (hex), i.e. the values between 0x00 and 0x20, are generally used to reference control characters, such as backspace, tab, return, escape, and the like, which in some implementations are not utilized in EPG data. Moreover, as discussed previously, EPG data may be encoded without using separate character encoding values for each capital letter. Therefore, even more character encoding values may be available in a character encoding table that may be utilized to compress EPG data. To further compress the EPG data, character encoding values that are not used to reference single characters in EPG data, i.e. non-standard character encoding values, may be used to reference character combinations that are likely to occur in the EPG data, thereby further compressing the EPG data. Non-standard character encoding values include character encoding values that are no-longer utilized to reference a standard character in the character table. For example, to provide for description of additional character combinations, the values between 0x00 and 0x20 (referencing control characters shown in bold below) that are used to reference control characters, and the values between 0x40 and 0x5B (referencing capital letters shown in bold below) that are utilized to reference capital letters may be utilized as non-standard encoding values.

The EPG application 114, when executed by the EPG server 112, initiates the compression routine 1006 to compress the EPG data 1004 using the character table 1002. For instance, characters and combinations of characters are replaced with character encoding values from the character table 1002. The EPG server 112 may then send compressed EPG data 1008 and the character table 1002 to the client device 104.

The client device 104 executes the decompression routine 1010 to decompress the compressed EPG data 1008 using the character table 1002. The decompression routine 1010, when executed, compares the character encoding values with the character encoding values in the character table 1002 to find a match. If the character encoding value is a standard character encoding value, the character referenced by the character encoding value is output. If the character encoding value is a non-standard character encoding value, the decompression routine 1010 translates the character encoding value into at least two index values, such as an index value 0x0<value> and an index value 0x1<value>. The index values are then utilized to find additional character encoding values in the character table 1002. The additional character encoding values may be either standard or non-standard character encoding values. In this way, each non-standard character encoding value may be utilized to reference two or more characters.

The compressed EPG data 1008, for instance, may include a compressed EPG data string having the following character encoding values:

42 8C 64 D7 22 46 65 61 07 03 00

| ASCII Character Table | | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | A | B | C | D | E | F |
| 0 | nul | soh | stx | etx | eot | enq | ack | bel | bs | ht | lf | vt | ff | cr | so | si |
| 1 | dle | dc1 | dc2 | dc3 | dc4 | nak | syn | etb | can | em | sub | esc | fs | gs | rs | us |
| 2 | sp | ! | " | # | $ | % | & | ' | ( | ) | * | + | , | - | . | / |
| 3 | 0 | 1 | 2 | 3 | 4 | 5 | 6 | 7 | 8 | 9 | : | ; | < | = | > | ? |
| 4 | @ | A | B | C | D | E | F | G | H | I | J | K | L | M | N | O |
| 5 | P | Q | R | S | T | U | V | W | X | Y | Z | [ | \ | ] | ^ | _ |
| 6 | ` | a | b | c | d | e | f | g | h | i | j | k | l | m | n | o |
| 7 | p | q | r | s | t | u | v | w | x | y | z | { | \| | } | ~ | del |

Figure 10:
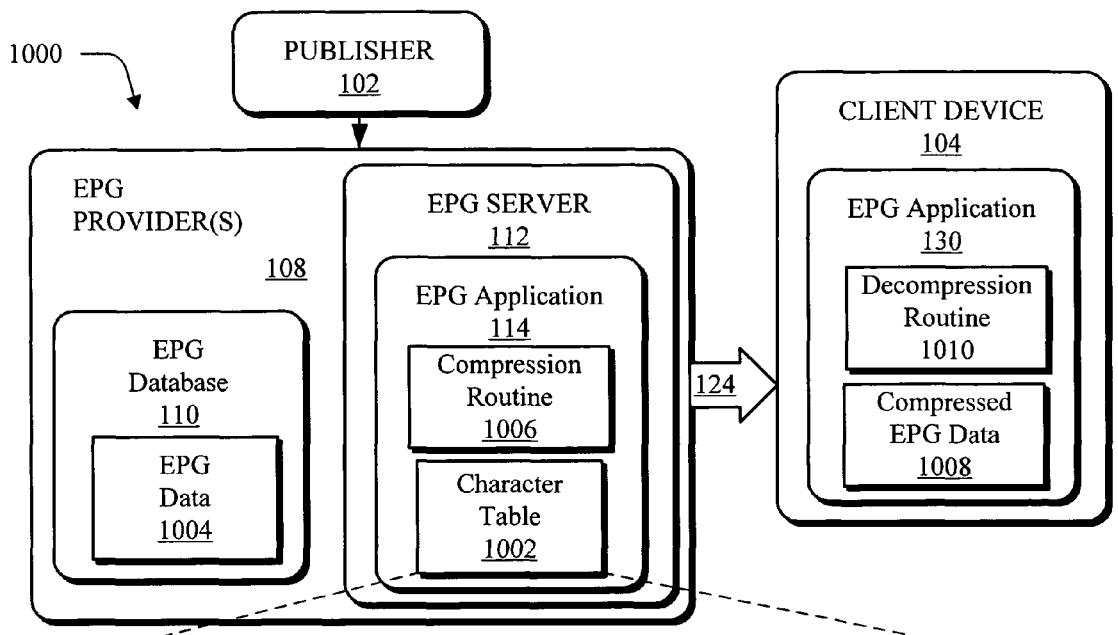
FIG. 10 is an illustration of an exemplary implementation showing portions of the television entertainment system of FIG. 1 and a character table that uses eight-bit character encoding values to reference one or more characters.

FIG. 10 is an illustration of an exemplary implementation 1000 showing portion of the television entertainment system of FIG. 1 and a character table 1002 that uses eight-bit character encoding values to reference one or more characters. The EPG server 112 of the EPG provider 108 receives EPG data 1004 from the publisher 102. The EPG application 114, when executed by the EPG server 112, initiates a compression routine 1006 to generate the character table 1002 from the EPG data 1004. The compression routine 1006 may be the same as or different from the compression routine 206 of FIG. 2. The compression routine 1006, when executed, examines characters included in the EPG data 1004 and finds the most common sets of characters that occur together in the EPG data 1004 to generate the character table 1002. Common sets of characters may be found in a similar manner to how common words were found as described in relation to FIGS. 4-6. Although the character table 1002 in this implementation was generated from the same set of EPG data 1004 that it will be utilized to compress, the character table 1002 may also be generated from previous sets of EPG data.

In this implementation, an ASCII encoding scheme will be described as supplying the standard encoding values. The character encoding value "42" is a standard character encoding value in the ASCII encoding scheme that references a "B." The character encoding value 8C is a non-standard character encoding value, e.g. the character encoding value 8C is not included in the range of character encoding values between 0x1F and 0x7F. Therefore, the non-standard character encoding value "8C" is translated into an index value "08C," which references a character encoding value "69," which references an "i" in the character table 1002. This is illustrated in FIG. 10 by the dashed box around the character encoding value "69" and the arrow to "i." The non-standard character encoding value "8C" is also translated into an index value 18C, which references a character encoding value "72," which references an "r" in the character table 1002. This is illustrated in FIG. 10 by the dashed box around the character encoding value "72" and the arrow to "r." The character encoding value "64" is a standard encoding value that references the letter "d." The character encoding value D7 is a non-standard character encoding value, and is therefore translated into index value "0D7." The index value "0D7" references the character encoding value "02" which is also a non-standard character encoding value. Therefore, the non-standard character encoding value "02" is translated into index value "002," which references a standard character encoding value "73" which references the letter "s." The non-standard character encoding value "02" is also translated into index value "102," which references a character encoding value "20" which references a "space." The non-standard character encoding value D7 is then translated into index value "1D7" which references a non-standard encoding value "2A." Therefore, "2A" is translated into index value "02A" which references a standard character encoding value "6F" which references the letter "o." The non-standard character encoding value "2A" is also translated into index value "12A" which references a non-standard character encoding value "19." Therefore, non-standard character encoding value "19" is translated into index value "019" which references a standard character encoding value "66" which references an "f." The non-standard character encoding value "19" is also translated into index value "119" which references a character encoding value "20" which references a space. The procedure continues until the character encoding value "00" that references a null value is read. The compressed EPG data string shown above is decompressed into "Birds of a feather" using the character table 1002. In this way, character encoding value may be utilized to reference one or more characters. For instance, the standard character encoding value "42" references a single character "B." The non-standard character encoding value "D7," when translated, references "s," "space," "o," "f," and "space." Although capitalized letters are included in the character table 1002, capitalized letters may be removed from the character table 1002 such that additional combinations of characters may be referenced. Capitalization rules may then be applied as previously discussed.

This compression technique described in relation to FIG. 10 may be combined with the exemplary compression techniques described in relation to FIGS. 3-9 to further compress EPG data. For example, eight-bit character encoding values may be utilized to reference one or more characters, and twelve bit word encoding values may be utilized to reference words in the word table 600 shown in FIG. 6. The character table 1002 and the word table 600, although discussed separately, may be combined into a single table in contemplated implementations.

Keyword Searches of Compressed EPG Data

Keyword searches may be performed to locate values that describe characteristics that may be of interest to a user. For example, a user may look for a keyword "everybody" which describes the characteristic "program title" to locate the television program "Everybody Loves Raymond" in the EPG data 300 of FIG. 3. Thus, the value "Everybody Loves Raymond" for the characteristic "program title" includes the keyword "everybody." To improve a keyword search performed on compressed EPG data, the size of the encoding values, i.e. an amount of bits used by the encoding values, in the EPG data may be utilized when searching the compressed EPG data. For example, word encoding values included in the word table 600 of FIG. 6 may use a matching predetermined amount of bits, e.g. twelve bits, while character encoding values may use a different predetermined amount of bits, e.g. eight bits. Therefore, if a requested keyword is included in the word table 600 of FIG. 6, encoding values that have the predetermined amount of bits of the word encoding values are examined to find the keyword. If the requested keyword is not included in the word table 600 of FIG. 6, encoding values that do not have the predetermined amount of bits of the word encoding values are examined to find the keyword.

Figure 11:
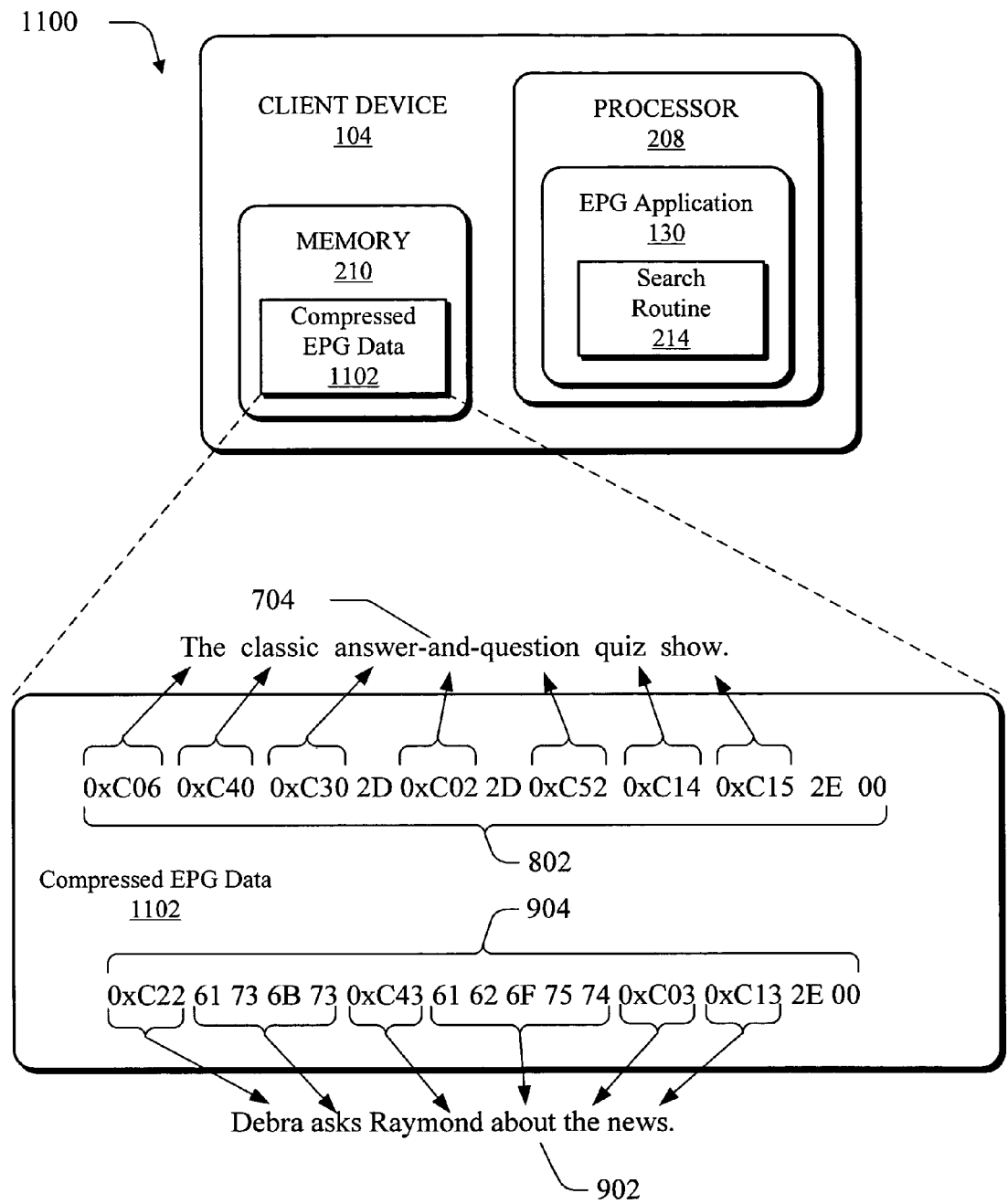
FIG. 11 is an illustration of an exemplary implementation showing the client device of FIG. 2 storing compressed EPG data that includes compressed EPG data strings from FIGS. 8 and 9.

FIG. 11 is an illustration of an exemplary implementation 1100 showing the client device 104 of FIG. 2 storing compressed EPG data 1102 that includes the compressed EPG data strings 802, 904 from FIGS. 8 and 9. EPG data strings 704, 902 are illustrated to show the corresponding words and characters for the respective encoding values in the compressed EPG data strings 802, 904, and are not included in the compressed EPG data 1102. The client device 104 includes the EPG application 130 having the search routine 214. The client device 104, through execution of the search routine 214 on the processor 208, performs a keyword search of the compressed EPG data 1102.

The compressed EPG data strings 802, 904 in the compressed EPG data 1102 include character encoding values that are used to encode characters and words that are not included in the word table 600 of FIG. 6. For example, the word "about" is not included in the word table 600 of FIG. 6, and is therefore represented with five character encoding values 61 62 6F 75 74 (hex). In this implementation, each character encoding value has eight bits. Words that are included in the word table 600 of FIG. 6 are represented in the compressed EPG data strings 802, 904 using twelve-bit word encoding values.

Through execution of the search routine 214, a keyword search may be performed that takes into account whether a keyword is or is not included in the word table 600 of FIG. 6. For example, the keyword search may be performed for the keyword "show" in the compressed EPG data strings 802, 904. The keyword "show" is first compared with words included in the word table 600 to find a match. When a match is found, the word encoding value 0xC15 that references the matching word in the word table 600 of FIG. 6 is retrieved. Encoding values in the compressed EPG data strings 704, 902 are examined that have the same amount of bits as the word encoding value, e.g. twelve bits. Therefore, the search routine 214 of the EPG application 130, when executed, examines values that have twelve bits to locate the word encoding value 0xC15 that references the keyword "show." For example, the search routine 214, when executed, may first examine the amount of bits in each encoding value in the compressed EPG data 1102. When the encoding value has the same amount of bits as the word encoding value, the word encoding value 0xC15 is compared with the encoding value in the compressed EPG data 1102. In this way, the character encoding values are not searched during this execution of the search routine 214, thereby reducing the amount of compressed EPG data 1102 that is searched to find the keyword. The value that includes the keyword may then be output by the search routine 214. For instance, in the current implementation, the value "The classic answer-and-quiz show." for the characteristic "program description" that includes the keyword "show" is output.

Likewise, if a keyword search was performed for a keyword "asks," the search routine 214, when executed, may first compare the keyword "asks" with words in the word table 600 shown in FIG. 6. The keyword "asks," however, does not match any of the words in the word table 600 shown in FIG. 6. Therefore, encoding values in the compressed EPG data strings 704, 902 are examined that do not have the same amount of bits as the word encoding values, i.e. twelve bits. In the illustrated example, combinations of 8-bit character encoding values are examined for the keyword. In this way, the word encoding values are not examined, thereby reducing the amount of compressed EPG data 1102 that is examined to find the keyword. The value that includes the keyword may then be output by the search routine 214. For example, the value "Debra asks Raymond about the news." for the characteristic "program description" that includes the keyword "asks" is output.

Event Identifiers

Figure 12:
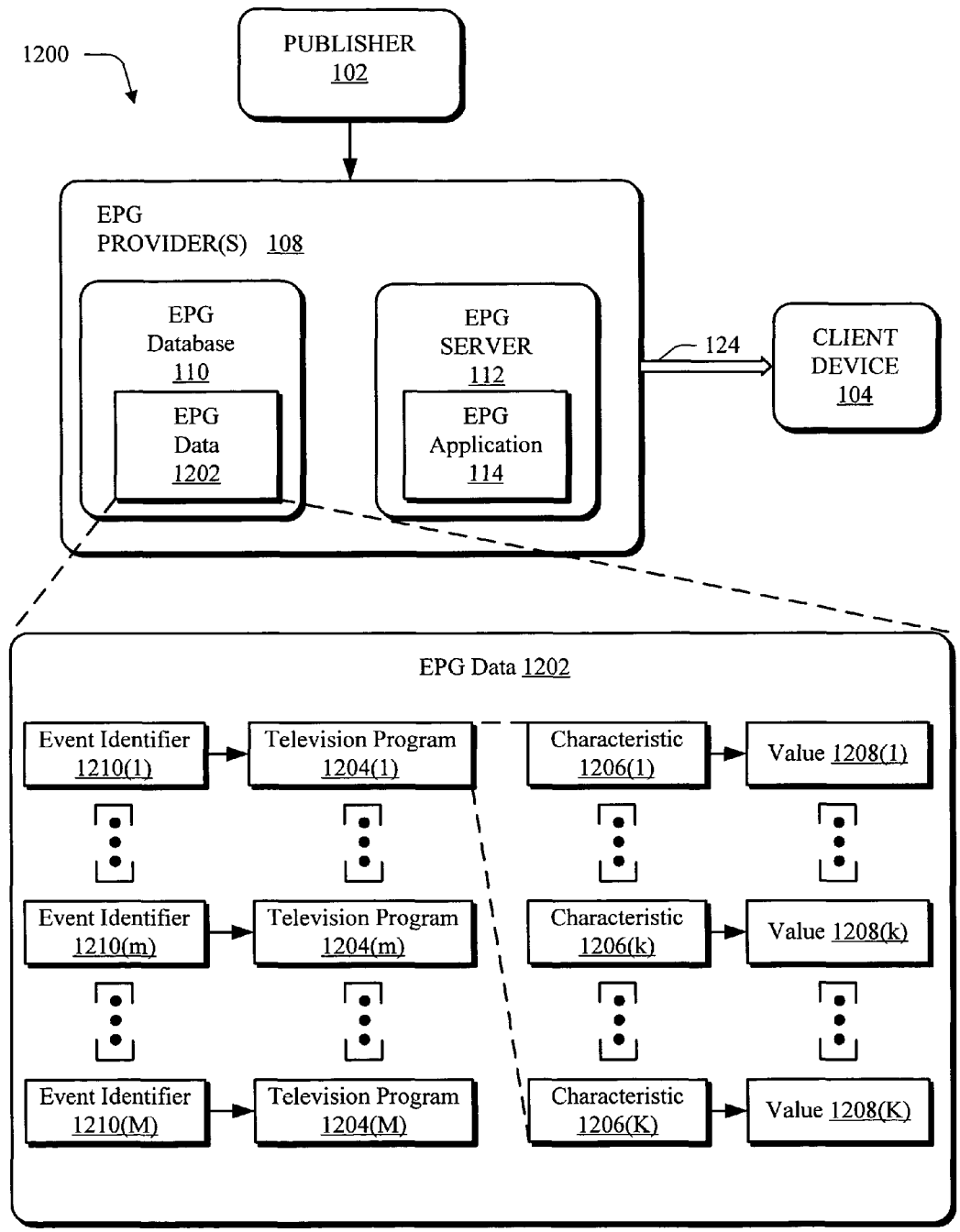
FIG. 12 is an illustration of an exemplary implementation in which the EPG server of FIG. 1 assigns event identifiers to reduce the amount of memory utilized to store EPG data and provide increased functionality when searching the EPG data using the event identifiers.

FIG. 12 is an illustration of an exemplary implementation 1200 in which the EPG server of FIG. 1 assigns event identifiers to reduce the amount of memory utilized to store EPG data. EPG data 1202 received by the EPG provider 108 from the publisher 102 may include identifiers assigned to each television program 1204(1), . . . , 1204(m), . . . , 1204(M). These identifiers are used to identify a particular television program, such as a particular episode. Each of the television programs 1204(1)-1204(M) have one or more characteristics 1206(1), . . . , 1206(k), . . . , 1206(K). Each of the characteristics have a corresponding value 1208(1), . . . , 1208(k), . . . , 1208(K) that describe the characteristic, such as "Everybody Loves Raymond" for the characteristic "program title."

Because there are a vast number of television programs that have been broadcast and that will be broadcast, each identifier provided by the publisher 102 utilizes a large amount of bits. To decrease the amount of memory used to store these identifiers, the EPG server 112, through execution of the EPG application 114, may assign event identifiers 1210(1), . . . 1210(m), . . . , 1210(M) to each of the television programs 1204(1), . . . , 1204(m), . . . , 1204(M) that are valid for a predetermined amount of time. For example, the predetermined amount of time may correspond to the amount of broadcast time described by the EPG data 1202, such as 36-hours, a week, two weeks, and so forth. In other words, the event identifiers 1210(1)-1210(M) are valid for the time of the broadcast of the television programs described in the EPG data, and then may be replaced and/or reused in a subsequent set of EPG data. For example, the event identifiers 1210(1)-1210(M), assigned by execution of the EPG application 114, may be set to expire after broadcast and then reused in conjunction with a new set of EPG data. In this way, the event identifiers 1210(1)-1210(M) assigned to each of the television programs 1204(1)-1204(M) may be smaller, e.g. use fewer bits, than the identifiers utilized by the publisher 102, thereby reducing the amount of memory used to store the EPG data 1202 on both the EPG server 112 and the client device 104.

Further, the event identifiers 1210(1)-1210(M) may be configured to further increase the functionality of the client device 104 when interacting with the EPG data 1202. The EPG server 112, through execution of the EPG application 114, may alphabetize all of the television programs for the predetermined amount of time. The EPG server 112 may then assign event identifiers to the television programs based on a first few characters of the television program's title. The event identifiers include a bin identifier and a unique identifier. The bin identifier is selected from a plurality of bin identifiers based on a portion of the program title of the corresponding television program. The unique identifier is unique for each television program that has a matching bin identifier. In other words, if two television programs have the same bin identifier, each television program is assigned a different unique identifier.

The EPG server 112 through execution of the EPG application 114 may assign an event identifier to a television program. The bin identifier included in the event identifier is selected from a plurality of bin identifiers based on a portion of a value that describes the characteristic "program title." For instance, each of the plurality of bin identifiers may correspond to a range of letters. Television programs with program titles that begin with numbers or other characters with an ASCII encoding value less than "A" may be assigned a bin identifier of 0x0000. Television programs with program titles that start with "A" but are less than "Ar" may be assigned bin identifiers of 0x1000. This process may continue with television programs having program titles with characters greater than "X" being assigned bin identifiers starting with 0x3F00. In this manner, the first six bits of the event identifier, i.e. the bin identifier, identifies a range of values of the program title of the corresponding television program.

The event identifier also includes a unique identifier that is unique for each television program that has a matching bin identifier. In one implementation, the event identifier has twelve-bits. Therefore, each event identifier may include a six-bit bin identifier that is selected based on a portion of the program title of the corresponding television program and a twelve-bit unique identifier that is unique for each television program that has a matching bin identifier. Although a six-bit bin identifier and a twelve-bit unique identifier have been discussed, other bit sizes may also be utilized.

Figure 13:
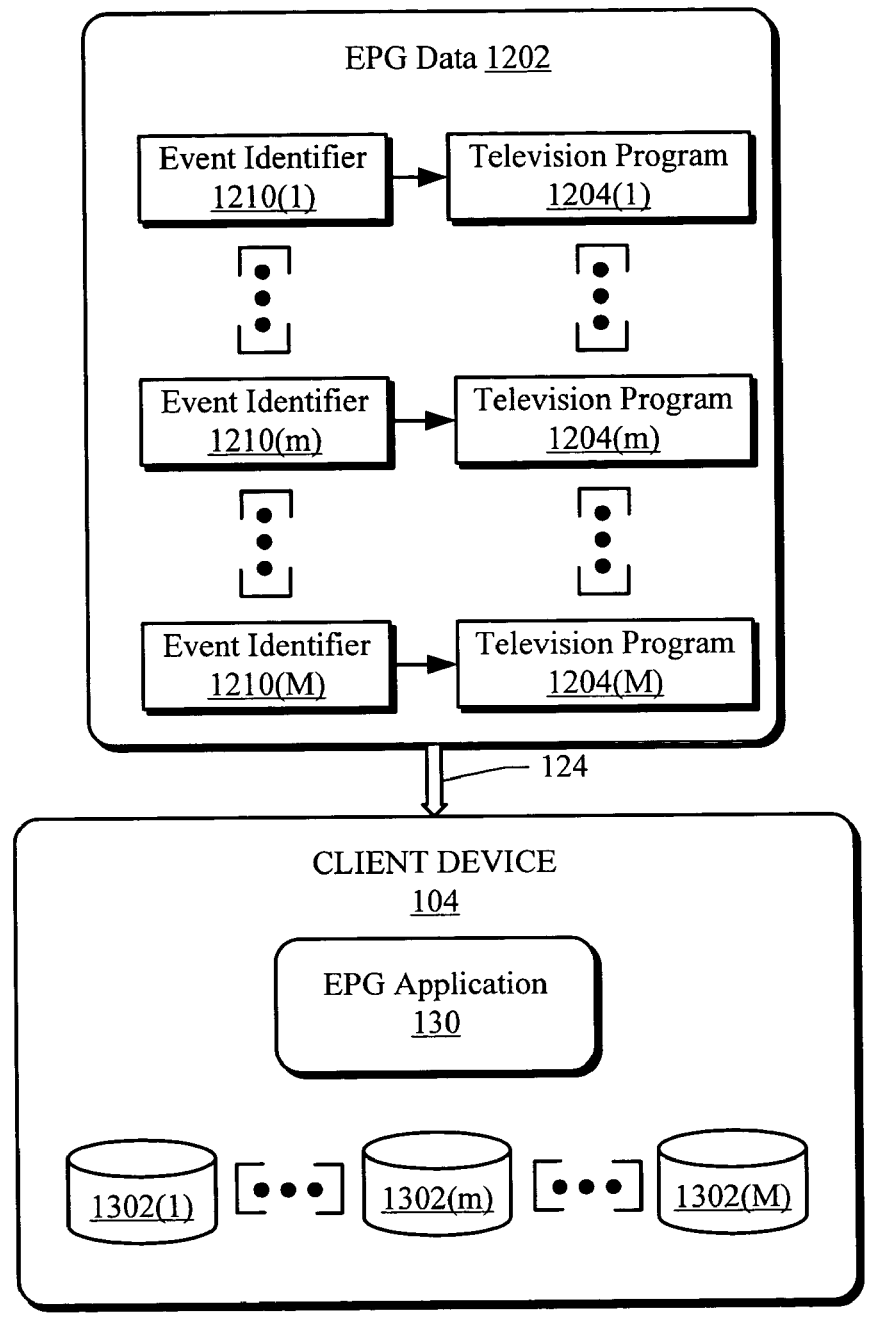
FIG. 13 is an illustration of an exemplary implementation showing the client device of FIG. 1 including a plurality of bins for storing the event identifiers of the EPG data of FIG. 12.

FIG. 13 is an illustration of an exemplary implementation 1300 showing the client device 104 of FIG. 1 as including a plurality of bins 1302(1)-1302(M) for storing the event identifiers 1204(1)-1204(M) of the EPG data 1202 of FIG. 12. The client device 104 may receive the EPG data 1202 from the EPG provider 108 of FIG. 12 over the broadcast network 124.

The EPG application 130 is executed on the client device 104 to store the event identifiers 1204(1)-1204(M) in the client device 104. The EPG application 130, when executed, stores the unique identifier in one of the plurality of bins 1302(1)-1302(M) that corresponds to the bin identifier in the corresponding event identifier. In other words, the EPG application 130 breaks-up the event identifier and stores each unique identifier included in the event identifier in a bin that matches the corresponding bin identifier. For example, the bin 1302(m) may match the bin identifier 0x1000, and therefore store unique identifiers included in event identifiers for television programs that have titles that begin with letters between "A" and "Ar." In this way, the full length of the event identifier is not stored by the client device 104, thereby further reducing the amount of bits used to store the EPG data 1202. The client device may regenerate the full eighteen-bit event identifier by AND-ing the six-bit value of the bin identifier that matches the bin 1302(m) and the twelve-bit unique identifier stored in the bin 1302(m).

As previously stated, the event identifiers 1210(1)-1210(M) identify respective one or more values that describe respective one or more television program characteristics. By using bins 1302(1)-1302(M), searches for the values of a desired television program may be performed in an efficient manner. For example, a user may request a search for the program description of a desired television program. The EPG application 130, when executed, searches just one bin 1302(m) from the plurality of bins 1302(1)-1302(M) based on the bin identifier included in the event identifier for the desired television program. The user, for instance, may wish to locate the program description for a television program "Arena Football." The EPG application 130, when executed, uses the corresponding event identifier for the television program to locate the program description. The EPG application 130 matches a bin identifier in the corresponding event identifier with a bin, in this instance bin 1302(m). The bin 1302(m) contains a plurality of unique identifiers that map to the values of characteristics of the television programs having that bin identifier. The EPG application 130 then matches the unique identifier portion of the event identifier with a unique identifier stored in the bin 1302(m). The unique identifier stored in the bin 1302(m) maps to the values of the characteristics for the desired television program. The EPG application 130 may then output the values. In this instance, a value for the characteristic "program description" is output for the desired television program "Arena Football."

Exemplary Procedures

Figure 14:
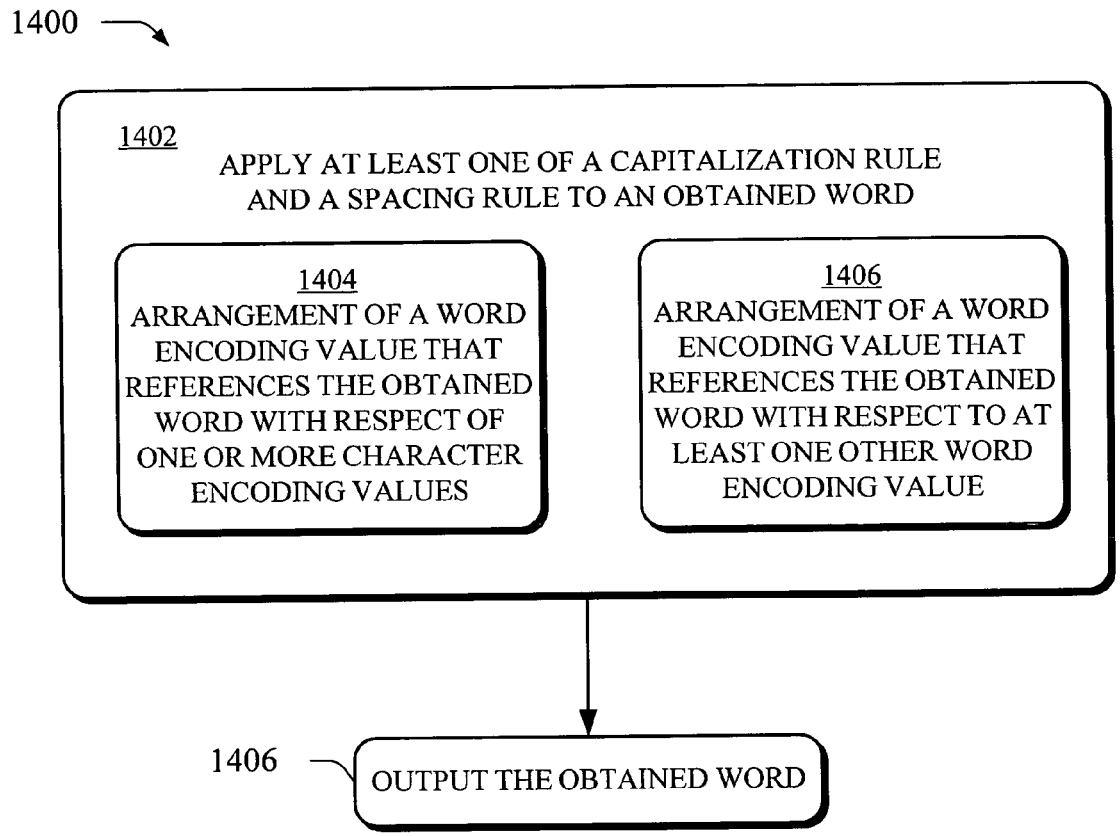
FIG. 14 is a flowchart illustrating a procedure of an exemplary implementation in which capitalization and spacing rules are applied to a word that is output from compressed EPG data

FIG. 14 is a flowchart illustrating a procedure 1400 of an exemplary implementation in which capitalization and spacing rules are applied to a word output from compressed EPG data. At block 1402, at least one of a capitalization rule and a spacing rule is applied to a word obtained from compressed EPG data. The compressed EPG data includes a plurality of word encoding values and a plurality of character encoding values, an example of which is shown in FIG. 11.

Each of the applied capitalization and spacing rules are based on block 1404 and/or block 1406. Block 1404 specifies that the capitalization and/or spacing rules are based on arrangement in the compressed EPG data of the word encoding value that references the obtained word with respect to one or more character encoding values. Block 1406 specifies that the capitalization and/or spacing rules are based on arrangement in the compressed EPG data of the word encoding value that references the obtained word with respect to at least one other word encoding value. At block 1408, the word to which the at least one of the capitalization rule and the spacing rule was applied is output.

Figure 15:
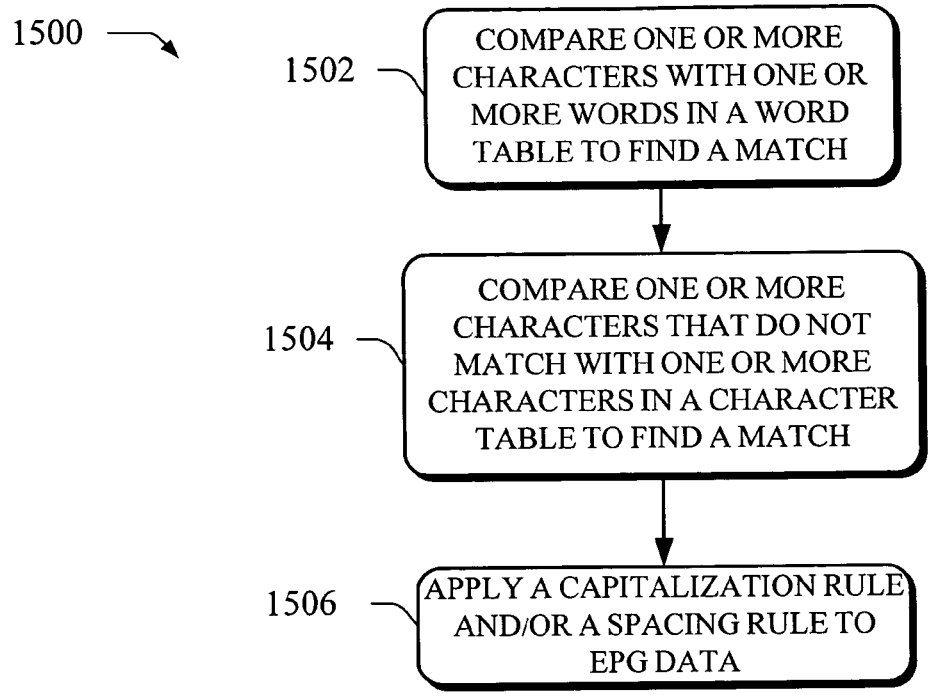
FIG. 15 is a flowchart depicting a procedure of an exemplary implementation in which capitalization and spacing rules are applied to compress EPG data.

FIG. 15 is a flowchart illustrating a procedure 1500 of an exemplary implementation in which capitalization and spacing rules are applied to compress EPG data. An EPG server may receive EPG data from a publisher. The EPG data may include a plurality of television programs. Each television program has one or more characteristics and each characteristic has a value. Each value has one or more characters. For example, a television program may have a characteristic "title" that describes the television program and a value for the title, such as "er." The value "er" includes the characters "e" and "r."

The EPG server executes an EPG application that includes a compression routine to compress the EPG data. At block 1502, the EPG application, when executed, compares one or more characters in the EPG data with one or more words in a word table to find a match. An example of the word table 600 is shown in FIG. 6. For each match, the one or more characters in the EPG data are replaced with the word encoding value in the word table the references the matching word, thereby compressing the EPG data.

At block 1504, the EPG application, when executed, compares one or more characters that do not match any of the words in the word table with one or more characters in a character table to find a match. Examples of character tables may be found in FIG. 10 and the ASCII character tables shown in the discussion. For each match, the one or more characters in the EPG data are replaced with a character encoding value from the character table that references the matching one or more characters, thereby compressing the EPG data.

At block 1506, capitalization and spacing rules are applied to the EPG data. Capitalization and spacing rules are based on arrangement of each word encoding value with respect to the character encoding values and/or other word encoding values in the EPG data. The compressed EPG data having the applied capitalization rule and/or spacing rule may then be output. For instance, the EPG server may broadcast the compressed EPG data over a broadcast network to a client device.

Figure 16:
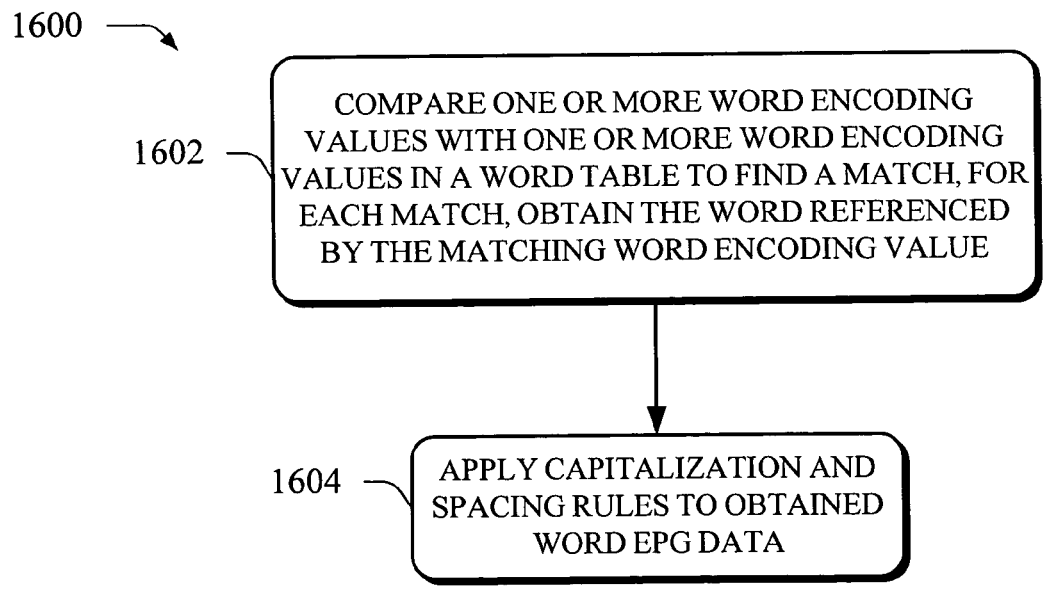
FIG. 16 is a flowchart depicting a procedure of an exemplary implementation in which compressed EPG data is decompressed in a manner that includes the application of capitalization and spacing rules.

FIG. 16 is a flowchart illustrating a procedure 1600 of an exemplary implementation in which compressed EPG data is decompressed in a manner that includes the application of capitalization and spacing rules. A client device may receive compressed EPG data that includes a plurality of word encoding values and a plurality of character encoding values. The word encoding values reference words in a word table, an example of which is shown in FIG. 6. The character encoding values reference one or more characters in a character encoding table, an example of which is shown in FIG. 10. To further compress the EPG data, capitalization and spacing rules may have been applied, such as was described in relation to FIG. 14. Therefore, to decompress EPG data that was compressed in this manner, the capitalization and spacing rules may be applied to provide capitalization and spacing of the EPG data.

At block 1602, an EPG application, when executed by a client device, compares one or more word encoding values in compressed EPG data with one or more word encoding values in a word table to find a match. For each match, the word referenced by the matching word encoding value is obtained.

At block 1604, the EPG application, when executed, applies capitalization and spacing rules to the obtained word based on arrangement of the word encoding value in the compressed EPG data. For example, capitalization and spacing rules may be based on arrangement of the word encoding value that references the obtained word with respect to one or more character encoding values in the compressed EPG data. Capitalization and spacing rules may also be based on arrangement of the word encoding value that references the obtained word with respect to at least one other word encoding value in the compressed EPG data. The word having the applied capitalization and spacing rules may then be output by the EPG application (when executed on the client device), such as output by a set-top box 126 for rendering on the display device 128 shown in FIG. 1.

Figure 17:
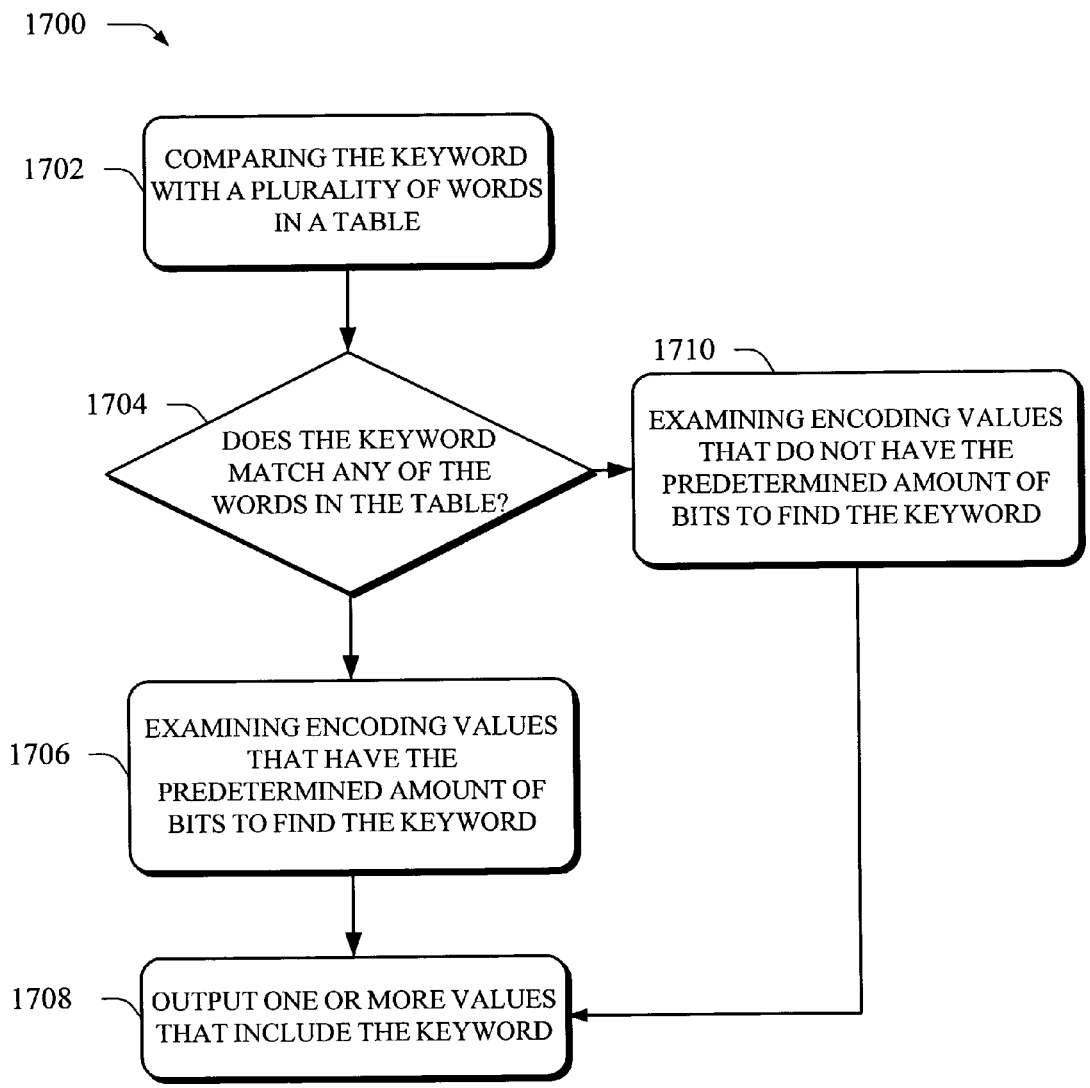
FIG. 17 is a flowchart depicting a procedure of an exemplary implementation in which a keyword search is performed on compressed EPG data.

FIG. 17 is a flowchart illustrating a procedure 1700 of an exemplary implementation in which a keyword search is performed on compressed EPG data. Compressed EPG data may include a plurality of television programs. Each television program includes one or more encoding values, which may include word encoding values and character encoding values. Whether the keyword is referenced by one or more character encoding values or a word encoding value in the EPG data may be taken into account when performing the search. The search may be performed through execution of the search routine 214 included in the EPG application 130 by the client device 104 as shown in FIG. 2.

At block 1702, the keyword is compared with a plurality of words in a word table. The word table includes a plurality of word encoding values. Each word encoding value references one of the words in the table. Each of the word encoding values have a matching predetermined amount of bits, e.g. 12 bits.

At decision block 1704, a determination is made as to whether the keyword matches any of the words in the table. When the keyword matches one of the plurality of word in the table, then at block 1706, encoding values in the EPG data are examined that have the predetermined amount of bits of the word encoding values to find the keyword. At block 1708, one or more values that include the keyword are output.

When the keyword does not match any of the plurality of word in the word table, then at block 1710, encoding values in the compressed EPG data are examined that do not have the predetermined amount of bits to find the keyword. At block 1706, one or more values that include the keyword are output.

Figure 18:
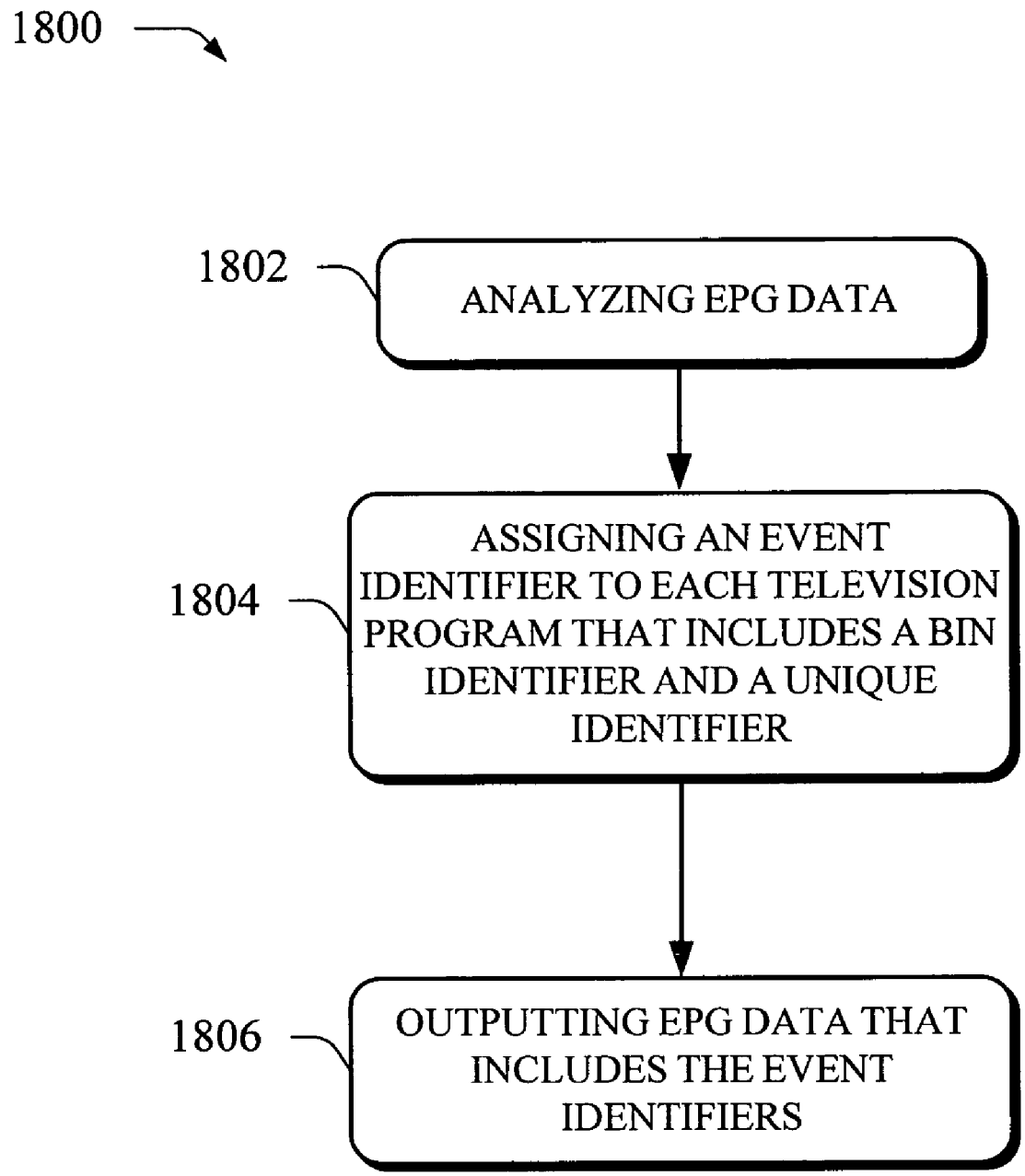
FIG. 18 is a flowchart depicting a procedure of an exemplary implementation in which event identifiers are assigned to television programs in EPG data.

FIG. 18 is a flowchart illustrating a procedure 1800 of an exemplary implementation in which event identifiers are assigned to television programs in EPG data. Event identifiers may be assigned to each of the television programs in EPG data for a predetermined amount of time. For example, the predetermined amount of time may correspond to the amount of broadcast time described by the EPG data, such as 36-hours, a week, two weeks, and so forth. Further, additional functionality may be included within the event identifiers to further increase the functionality of the client device when interacting with the EPG data. For example, the event identifiers may be configured to increase the speed of searches performed using the event identifiers.

At block 1802, EPG data is analyzed. The EPG data includes a plurality of television programs. Each television program has one or more characteristics. Each characteristic has a value. One such characteristic is a program title of a corresponding television program.

At block 1804, an event identifier is assigned to each television program based on the analysis. Each event identifier includes a bin identifier. The bin identifier is selected from a plurality of bin identifiers based on a portion of a value of the program title of the corresponding television program. For example, the portion of the program title may be based on the "stopped name" of the television program, which is a shortened version of the program title that contains the identifying words, without common joiner words such as "the," "and," and so forth. For example, the program title "The evening news" may have a stopped name of "evening news." Each event identifier also includes a unique identifier that is unique for each television program that has a matching bin identifier. For instance, if there are multiple television programs included in EPG data that have the title "The evening news," each television, program may be assigned the same bin identifier, but have different unique identifiers. At block 1806, EPG data that includes the event identifier is output. For example, the EPG server 112 may execute the EPG application 114 to assign the event identifier and broadcast the EPG data over a broadcast network 124 to the client device 104 shown in FIG. 2.

Figure 19:
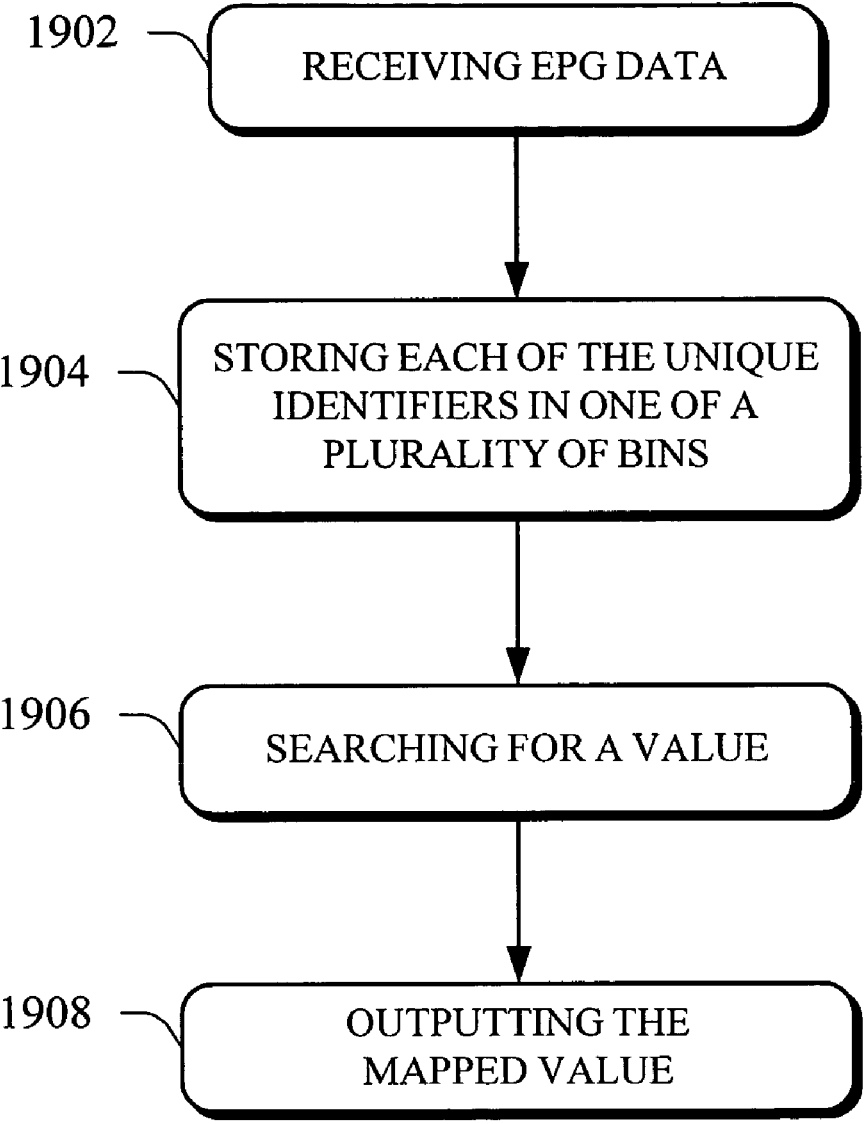
FIG. 19 is a flowchart depicting a procedure of an exemplary implementation in which EPG data that includes event identifiers is stored and searched by a client device.

FIG. 19 is a flowchart depicting a procedure 1900 of an exemplary implementation in which EPG data that includes event identifiers is stored and searched by a client device. At block 1902, a client device receives EPG data. For instance, the EPG data may be broadcast from the EPG server as described in relation to FIG. 17. The EPG data includes a plurality of television programs. Each television program has an event identifier that is used to reference one or more values that describe respective one or more characteristics. For instance, one such characteristic is a program title of a television program.

At block 1904, each of the unique identifiers is stored in one of a plurality of bins. Each unique identifier is stored in a bin that matches the bin identifier included in the corresponding event identifier. For example, the EPG application 130, when executed by the client device 104 shown in FIG. 13, may sort the unique identifiers into bins. Each unique identifier is placed in a bin that matches its corresponding bin identifier. At block 1906, a search for one of the values in the EPG data for a desired television program is performed. The search is performed by using the corresponding event identifier of the desired television program. Searching may include locating a bin from the plurality of bins that matches a bin identifier included in the corresponding event identifier. A unique identifier of the corresponding event identifier is then matched with a unique identifier included in the located bin. The matching unique identifier in the located bin maps to the value of the desired television program. At block 1908, the mapped value is output.

Exemplary Environment

Figure 20:
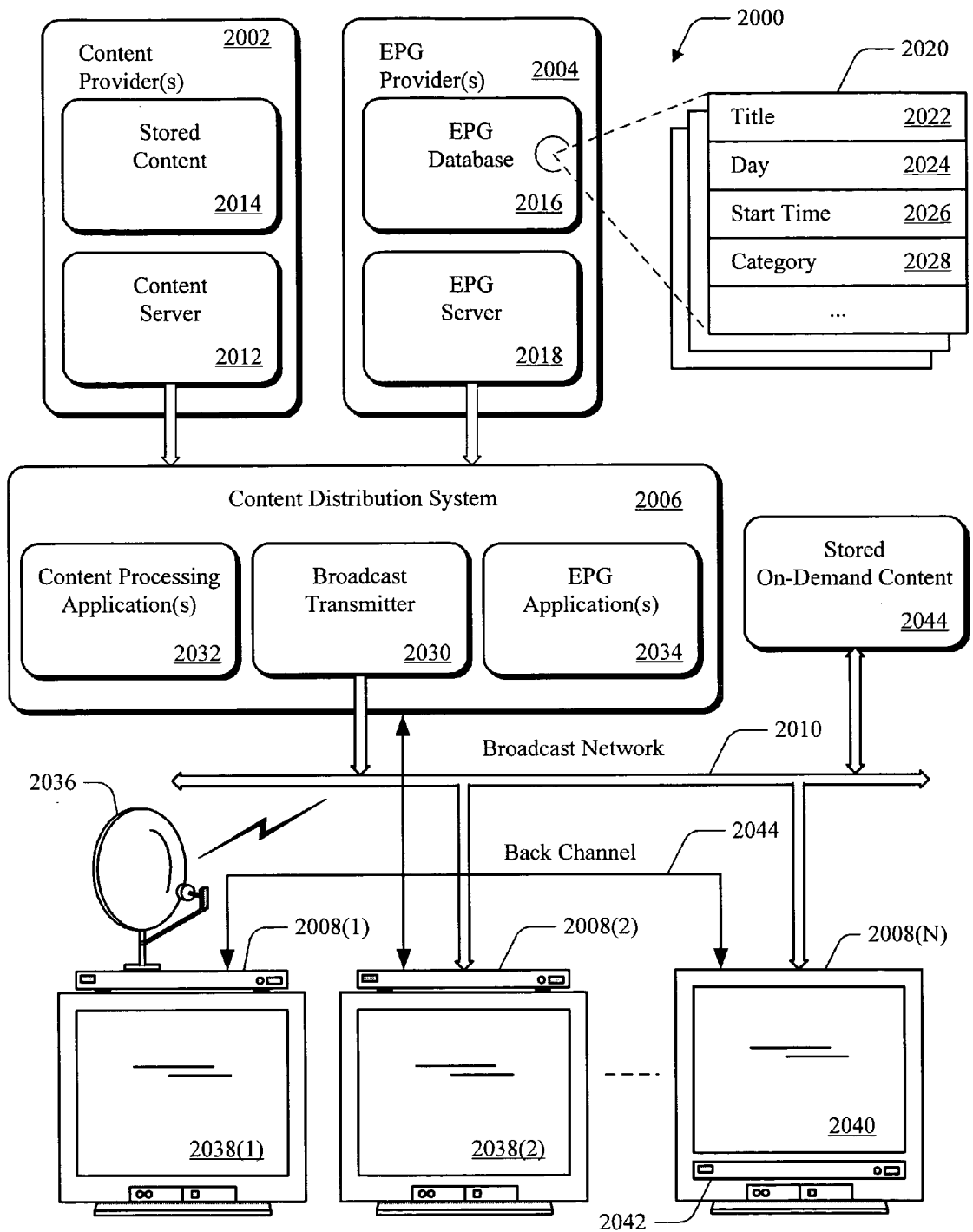
FIG. 20 illustrates an exemplary television entertainment system that is an architecture in which EPG data compression, decompression, capitalization and spacing rules, and keyword searches may be implemented.

FIG. 20 illustrates an exemplary television entertainment system 2000 that is an architecture in which EPG data compression and decompression may be implemented. System 2000 facilitates distribution of television programming, such as content, and EPG data to multiple viewers, and includes components to further facilitate EPG data compression. The system 2000 includes one or more content providers 2002, one or more EPG providers 2004, a content distribution system 2006, and multiple client devices 2008(1), 2008(2), ..., 2008(N) coupled to the content distribution system 2006 via a broadcast network 2010. The client devices 2008(1)-2008(N) and broadcast network 2010 can either be the same as or different from the client devices 104 and broadcast network 124 shown in FIG. 1.

Content provider 2002 includes a content server 2012 and stored television programming, such as content 2014. Content server 2012 controls distribution of the stored content 2014 from content provider 2002 to the content distribution system 2006. Additionally, content server 2012 controls distribution of live content (e.g., content that was not previously stored, such as live feeds) and/or content stored at other locations to the content distribution system 2006. EPG provider 2004 includes an EPG database 2016 and an EPG server 2018. The EPG database 2016 stores electronic files of EPG data which are used to generate an EPG. The EPG provider 2004 may also obtain EPG data from other sources, such as the publisher 102 shown in FIG. 1. The EPG provider 2004, EPG database 2016 and EPG server 2018 can either be the same as or different from the EPG provider 108, EPG database 110 and EPG server 112 shown in FIG. 1.

An electronic file maintains EPG data 2020 that may include a program title 2022, day(s) 2024 to identify which days of the week the television program will be shown, start time(s) 2026 to identify a time that the television program will be shown on the particular day or days of the week, and a category 2028. A category, which may be considered a type of characteristic, describes the genre of a television program and categorizes it as a particular television program type. For example, a television program can be categorized as a movie, a comedy, a sporting event, a news program, a sitcom, a talk show, or as any number of other category descriptions. EPG data 2020 may also include program ratings, characters, descriptions, protagonist's name, station identifiers, channel identifiers, and other schedule information. Additionally, EPG data 2020 may include video-on-demand information, such as movie schedules, as well as application information, such as for interactive games, and other programming information that may be of interest to a viewer.

The EPG server 2018 processes the EPG data 2020 prior to distribution to generate a published version of the EPG data which can contain programming information for all broadcast channels and on-demand content listings for one or more days. The processing may involve any number of techniques to reduce, modify, or enhance the EPG data 2020. Such processes might include selection of television programs, television program compression, format modification, and the like. The EPG server 2018 controls distribution of the published version of the EPG data from EPG provider 2004 to the content distribution system 2006 using, for example, a file transfer protocol (FTP) over a TCP/IP network (e.g., Internet or Intranet). Further, the published version of the EPG data can be transmitted from EPG provider 2004 via a satellite and the content distribution system 2006 directly to a client device 2008.

Content distribution system 2006 includes a broadcast transmitter 2030, one or more content processing applications 2032, and may contain one or more EPG data processing applications 2034. Broadcast transmitter 2030 broadcasts signals, such as cable television signals, across broadcast network 2010. Broadcast network 2010 can include a cable television network, RF, microwave, satellite, and/or data network, such as the Internet, and may also include wired or wireless media using any broadcast format or broadcast protocol. Additionally, broadcast network 2010 can be any type of network, using any type of network topology and any network communication protocol, and can be represented or otherwise implemented as a combination of two or more networks.

A content processing application 2032 processes the content received from content provider 2002 prior to transmitting the content across broadcast network 2010. Similarly, the EPG application 2034 processes the EPG data received from EPG provider 2004 prior to transmitting the EPG data across broadcast network 2010. A particular content processing application 2032 may encode, or otherwise process, the received content into a format that is understood by the multiple client devices 2008(1), 2008(2), . . . , 2008(N) coupled to broadcast network 2010. Although FIG. 20 shows a single content provider 2002, a single EPG provider 2004, and a single content distribution system 2006, exemplary system 2000 can include any number of content providers and/or EPG data providers coupled to any number of content distribution systems.

Content distribution system 2006 is representative of a head end that provides EPG data, as well as content, to multiple subscribers. The content distribution system 2006 in other embodiments may include the EPG server 2018. Each content distribution system 2006 may receive a slightly different version of the EPG data that takes into account different programming preferences and lineups. The EPG server 2018 may create different versions of an EPG that includes those channels of relevance to respective head end services, and the content distribution system 2006 transmits the EPG data to the multiple client devices 2008(1), 2008(2), . . . , 2008(N). In one implementation, for example, content distribution system 2006 utilizes a carousel file system to repeatedly broadcast the EPG data over an out-of-band (OOB) channel to the client devices 2008. Alternatively, the multiple client devices 2008(1), 2008(2), . . . , 2008(N) can receive standard, or uniform, EPG data and individually determine the EPG data to display based on the associated head end service.

Client devices 2008 can be implemented in a number of ways. For example, a client device 2008(1) receives content broadcast from a satellite-based transmitter via a satellite dish 2036. Client device 2008(1) is also referred to as a set-top box or a satellite receiving device. Client device 2008(1) is coupled to a television 2038(1) for presenting the content received by the client device (e.g., audio data and video data), as well as a graphical user interface. A particular client device 2008 can be coupled to any number of televisions 2038 and/or similar devices that can be implemented to display or otherwise render content. Similarly, any number of client devices 2008 can be coupled to a single television 2038.

Client device 2008(2) is also coupled to receive content broadcast from broadcast network 2010 and provide the received content to associated television 2038(2). Client device 2008(N) is an example of a combination television 2040 and integrated set-top box 2042. In this example, the various components and functionality of the set-top box are integrated into the television, rather than using two separate devices. The set-top box integrated into the television can receive broadcast signals via a satellite dish (similar to satellite dish 2036) and/or via broadcast network 2010. In alternate implementations, client devices 2008 may receive broadcast content via the Internet or any other broadcast medium, such as back channel 2044 which can be implemented as an Internet protocol (IP) connection or as other protocol connections using a modem connection and conventional telephone line, for example. Further, back channel 2044 provides an alternate communication link between each of the client devices 2008, and between the client devices 2008 and the content distribution system 2006.

The exemplary system 2000 also includes stored on-demand content 2044, such as Video On-Demand (VOD) movie content. The stored on-demand content can be viewed with a television 2038 via a client device 2008 through an onscreen EPG, for example, and a viewer can enter instructions to stream a particular movie, or other stored content, to a corresponding client device 2008.

Exemplary EPG Data System

Figure 21:
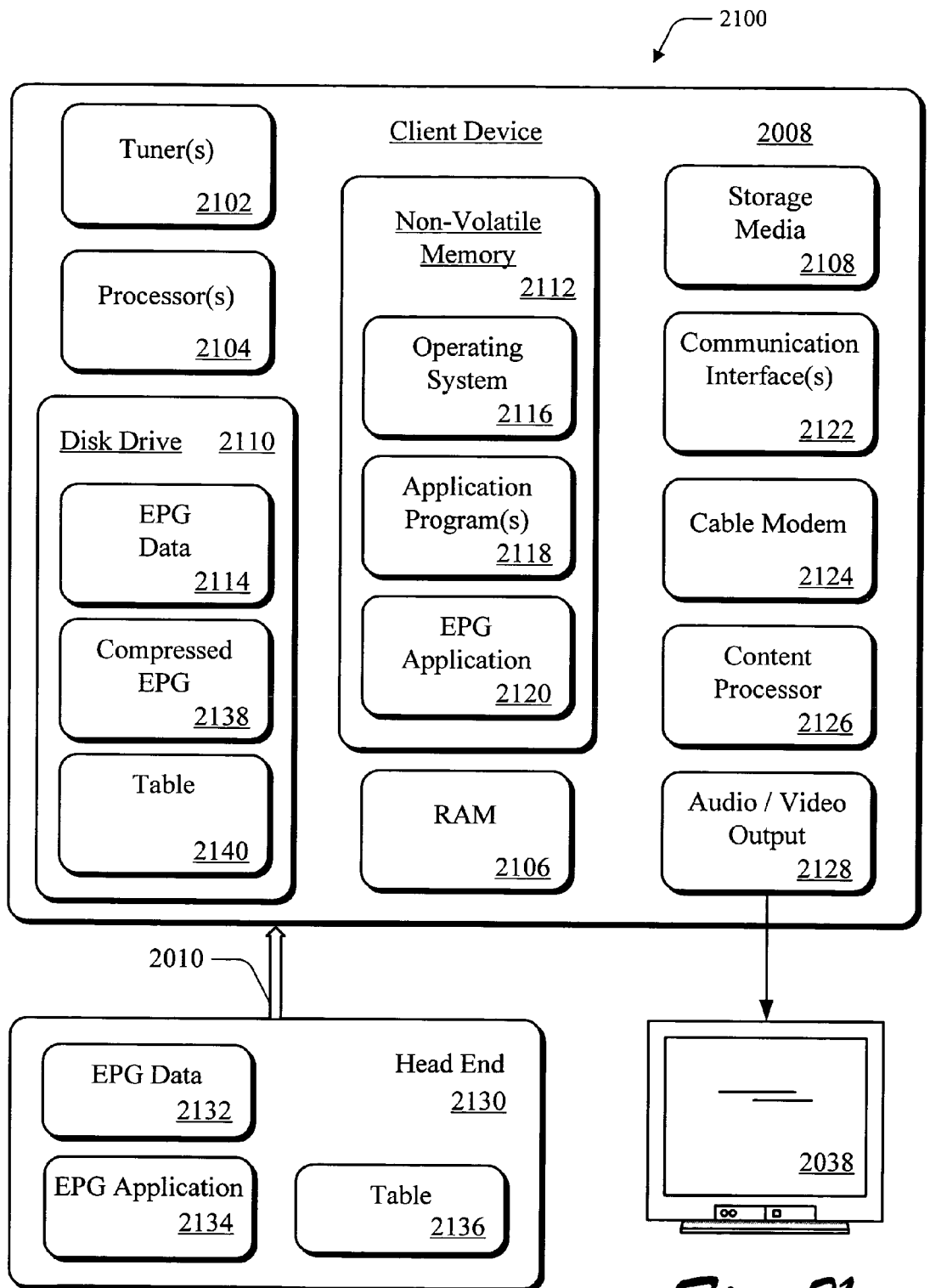
FIG. 21 illustrates selected components of the television entertainment system of FIG. 12, such as an exemplary client device and a television.

FIG. 21 illustrates an exemplary EPG data system 2100 that includes selected components of television system 2000, such as an exemplary client device 2008 and a television 2038. Client device 2008 includes components to implement EPG data decompression, keyword searching and searching using event identifiers in a television-based entertainment and information system. Client device 2008 can be implemented as a set-top box, a satellite receiver, a TV recorder with a hard disk, a digital video recorder (DVR) and playback system, a personal video recorder (PVR) and playback system, a game console, an information appliance, and as any number of similar embodiments.

Client device 2008 includes one or more tuners 2102 which are representative of one or more in-band tuners that tune to various frequencies or channels to receive television signals, as well as an out-of-band tuner that tunes to the broadcast channel over which the EPG data is broadcast to client device 2008. Client device 2008 also includes one or more processors 2104 (e.g., microprocessors) which process various instructions to control the operation of client device 2008 and to communicate with other electronic and computing devices.

Client device 2008 can be implemented with one or more memory components, examples of which include a random access memory (RAM) 2106, mass storage media 2108, a disk drive 2110, and a non-volatile memory 2112 (e.g., ROM, Flash, EPROM, EEPROM, etc.). The memory components (e.g., RAM 2106, storage media 2108, disk drive 2110, and non-volatile memory 2112) store various information and/or data such as received content, EPG data 2114, configuration information for client device 2008, and/or graphical user interface information.

Alternative implementations of client device 2008 can include a range of processing and memory capabilities, and may include any number and different memory components than those illustrated in FIG. 21. For example, full-resource clients can be implemented with substantial memory and processing resources, including the disk drive 2110. Low-resource clients, however, may have limited processing and memory capabilities, such as a limited amount of RAM 2106 and limited processing capabilities of a processor 2104.

An operating system 2116 and one or more application programs 2118 can be stored in non-volatile memory 2112 and executed on a processor 2104 to provide a runtime environment. A runtime environment facilitates extensibility of client device 2008 by allowing various interfaces to be defined that, in turn, allow application programs 2118 to interact with client device 2008. The application programs 2118 that may be implemented in client device 2008 can include a browser to browse the Web (e.g., "World Wide Web"), an email program to facilitate electronic mail, and so on.

An EPG application 2120 is stored in memory 2112 to process the EPG data 2114 and generate an EPG. The EPG application 2120 utilizes the EPG data 2114 and enables a television viewer to navigate through an onscreen EPG and locate television shows, video on-demand movies, interactive game selections, and other media access information of interest to the viewer. With the EPG application 2120, the television viewer can look at schedules of current and future programming, set reminders for upcoming programs, and/or enter instructions to record one or more television shows or video on-demand movies. Further, the EPG application 2120 may be used to perform keyword searches as described in relation to FIG. 10, store and search event identifiers as described in relation to FIG. 21, and so on.

Client device 2008 further includes one or more communication interfaces 2122 and a PSTN, DSL, or cable modem 2124. A communication interface 2122 can be implemented as a serial and/or parallel interface, as a wireless interface, and/or as any other type of network interface. A wireless interface enables client device 2008 to receive input commands and other information from a user-operated input device, such as from a remote control device or from another infrared (IR), 802.11, Bluetooth, or similar RF input device. Input devices can include a wireless keyboard or another handheld input device such as a personal digital assistant (PDA), handheld computer, wireless phone, or the like. A network interface and a serial and/or parallel interface enables client device 2008 to interact and communicate with other electronic and computing devices via various communication links. Modem 2124 facilitates client device 2008 communication with other electronic and computing devices via a conventional telephone line, a DSL connection, or a cable modem.

Client device 2008 also includes a content processor and/or decoder 2126 to process and decode broadcast video signals, such as NTSC, PAL, SECAM, or other television system analog video signals, as well as a DVB, ATSC, or other television system digital video signals. Content processor 2126 can also include a video decoder and/or additional processors to receive, decode, and/or process video content received from content distribution system 2006 (FIG. 20) which is representative of a head end service that provides EPG data, as well as content, to multiple client devices 2008. Content processor 2126 can include an MPEG-2 or MPEG-4 (Moving Pictures Experts Group) decoder that decodes MPEG-encoded video content. MPEG supports a variety of audio/video formats, including legacy TV, HDTV (high-definition television), DVD (digital versatile disc), and five-channel surround sound.

Typically, video content includes video data and audio data that corresponds to the video data. Content processor 2126 generates video and/or display content that is formatted for display on display device 2038, and generates decoded audio data that is formatted for output by an audio device, such as one or more speakers (not shown) in display device 2038. Content processor 2126 can include a display controller (not shown) that processes the video and/or display content to display corresponding images on display device 2038. A display controller can include a microcontroller, integrated circuit, and/or similar video processing component to process the images. Client device 2008 also includes an audio and/or video output 2128 that provides the video and/or display signals to television 2038 or to other devices that process and/or display, or otherwise render, the audio and video data. It is to be noted that the systems and methods described herein can be implemented for any type of encoding format as well as for data and/or content streams that are not encoded.

Although shown separately, some of the components of client device 2008 may be implemented in an application specific integrated circuit (ASIC). Additionally, a system bus (not shown) typically connects the various components within client device 2008. A system bus can be implemented as one or more of any of several types of bus structures, including a memory bus or memory controller, a peripheral bus, an accelerated graphics port, or a local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

The exemplary EPG data compression system 2100 also includes a head end 2130 as an implementation of content distribution system 2006 (FIG. 20) which is representative of a head end that provides EPG data 2132, as well as content, to client device 2008. Head end 2130 includes an EPG application 2134 (e.g., an EPG data processing application 2034 as shown in FIG. 20) implemented to process EPG data 2132 as well as implement the EPG data compression procedures described herein, such as application of capitalization and spacing rules and assigning event identifiers.

The EPG application 2134 can be implemented as a software component that executes on a processor and is stored in a non-volatile memory device in head end 2130. Although EPG application 2134 is illustrated and described as a single application configured to perform several functions of EPG data compression, the EPG application 2134 can be implemented as several component applications distributed to each perform one or more functions in a computing device, a digital video recorder system, a personal video recorder system, and/or any other television-based entertainment and information system.

The EPG application 2134 generates a table 2136 including identifiers and values found in the EPG data 2132, such as a word table 600 as described in relation to FIG. 6 and/or a character table 1002 as described in relation to FIG. 10. The table 2136 may be generated by the head end 2130 with the EPG application 2134 when the head end generates the EPG data for an arbitrary time period and compresses the EPG data for communication to the client device 2008 via broadcast network 2010. In another implementation, the table 2136 may be generated and stored by the client device 2008 for use in generating a plurality of EPGs. Client device 2008 may receive compressed EPG data 2138 from head end 2130 and stores the compressed EPG data 2138 and the associated table 2140 in disk drive 2110. Although this example describes compressing the EPG data before transmitting the EPG data to reduce transmission bandwidth, client device 2008 may also receive EPG data and then generate the table, as well as compress the EPG data, to reduce the memory storage space needed to maintain, or otherwise store, the EPG data.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
   compressing electronic program guide (EPG) data using:
      a character compression technique that generates a compression table by examining the EPG data to recognize common sets of characters, the compression table being used to assign a plurality of character encoding values to represent each common set of characters;

a word compression technique that analyzes the EPG data to create a word table that includes words having a predetermined number of letters, wherein words having the predetermined number of letters are represented by a plurality of word encoding values; and spacing and capitalization rules to reduce a number of character encoding values in the EPG data in which one of the spacing rules includes removing character encoding values that identify spaces in the compressed EPG data, and one of the capitalization rules includes limiting a number of character encoding values such that separate encoding values are not needed to represent capital letters;

applying at least one of the capitalization rules and one of the spacing rules to a word obtained from the compressed EPG data, the compressed EPG data including the plurality of word encoding values and the plurality of character encoding values, wherein each of the capitalization and spacing rules is based on an arrangement, in the compressed EPG data, of one word encoding value that references the obtained word with respect to at least one of:

one or more of the character encoding values; and one other word encoding value; and outputting the obtained word to which at least one of the capitalization rules and the spacing rules was applied.

2. A method as described in claim 1, wherein each capitalization rule specifies capitalizing a first character included in the obtained word based upon a condition selected from the group consisting of:

if the word encoding value that references the obtained word in the compressed EPG data immediately follows one character encoding value in the compressed EPG data that indicates an end of a sentence or an end of a previous data string; and if the word encoding value that references the obtained word in the compressed EPG data is ordered as a first encoding value in a compressed data string included in the compressed EPG data.

3. A method as described in claim 1, wherein the spacing rule is selected from the group consisting of:

a first spacing rule that specifies if the word encoding value that references the obtained word directly follows another word encoding value, then a single space is inserted between the obtained word and a word referenced by the other word encoding value;

a second spacing rule that specifies if the word encoding value that references the obtained word directly precedes one character encoding value that references a letter or a number, then a space is inserted after the obtained word; and a third spacing rule that specifies if the word encoding value that references the obtained word directly follows one character encoding value that references a letter or a number, then a space is inserted before the obtained word.

4. One or more computer-readable media comprising computer-executable instructions that, when executed, perform the method as recited in claim 1.

5. A method comprising:

compressing electronic program guide (EPG) data by:

generating a compression table by examining the EPG data to recognize common sets of characters, the compression table being used to assign a plurality of character encoding values to represent each common set of characters;

analyzing the EPG data to create a word table that includes words having a predetermined number of letters, wherein words having the predetermined number of letters are represented by a plurality of word encoding values; and reducing a number of character encoding values in the EPG data, the reducing including using one of a plurality of spacing rules to remove character encoding values that identify spaces in the compressed EPG data, and using one of a plurality of capitalization rules to limit a number of character encoding values such that separate encoding values are not needed to represent capital letters;

decompressing the EPG data that includes the plurality of word encoding values and the plurality of character encoding values, the compressed EPG data being decompressed by:

comparing one or more of the plurality of word encoding values with word encoding values in a word table to find a match, wherein:

each word encoding value in the word table references a word included in the word table; and for each match, obtaining the word referenced by the matching word encoding value from the word table;

applying at least one of the capitalization rules and the spacing rules to the obtained word that is based on an arrangement, in the compressed EPG data, of one word encoding value that references the obtained word with respect to at least one of:

one or more of the character encoding values; and one other word encoding value; and outputting the obtained word to which at least one of the capitalization rule and the spacing rule was applied.

6. A method as described in claim 5, wherein each capitalization rule specifies capitalizing a first character included in the obtained word based upon a condition selected from the group consisting of:

if the word encoding value that references the obtained word in the compressed EPG data immediately follows one character encoding value in the compressed EPG data that indicates an end of a sentence or an end of a previous data string; and if the word encoding value that references the obtained word in the compressed EPG data is ordered as a first encoding value in a compressed data string included in the compressed EPG data.

7. A method as described in claim 5, wherein the spacing rule is selected from the group consisting of:

a first spacing rule that specifies if the word encoding value that references the obtained word in the compressed EPG data directly follows another word encoding value in the compressed EPG data, then a single space is inserted between the obtained word and a word referenced by the other word encoding value;

a second spacing rule that specifies if the word encoding value that references the obtained word in the compressed EPG data directly precedes one character encoding value in the compressed EPG data that references a letter or a number, then a space is inserted after the obtained word; and a third spacing rule that specifies if the word encoding value that references the obtained word in the compressed EPG data directly follows one character encoding value in the compressed EPG data that references a letter or a number, then a space is inserted before the obtained word.

8. One or more computer-readable media comprising computer-executable instructions that, when executed, perform the method as recited in claim 5.

9. A method comprising:
compressing electronic program guide (EPG) data that includes a plurality of television programs, each television program having one or more television program characteristics, each television program characteristic having a value, each value having one or more characters, the EPG data being compressed by:
comparing the one or more characters of each value with one or more words in a word table to find a match, wherein each word in the word table is referenced by a word encoding value in the word table, and for each match, replacing the matching one or more characters of each value with the word encoding value in the word table that references the matching word;
comparing the one or more characters of each value that do not match any of the words in the word table with one or more characters in a character table to find a match, wherein the character table includes one or more character encoding values, and wherein each character encoding value references one or more of the characters in the character table, and for each match, replacing the matching one or more characters of each value with the character encoding value in the character table that references the matching one or more characters; and
applying one or more spacing rules and capitalization rules to the EPG data that are based on an arrangement of each word encoding value with respect to at least one of:
one character encoding value; and
one other word encoding value,
wherein one of the spacing rules reduces reduce a number of the character encoding values in the EPG data by removing character encoding values that identify spaces in the compressed EPG data, and one of the capitalization rules includes limiting a number of the character encoding values such that separate encoding values are not needed to represent capital letters.

10. A method as described in claim 9, further comprising outputting the EPG data to which the one or more spacing rules were applied.

11. A method as described in claim 9, wherein each spacing rule specifies removal of each character encoding value from the EPG data that references a space based upon a condition selected from the group consisting of:
the character encoding value that references the space is disposed directly between two word encoding values;
the character encoding value that references the space directly follows one word encoding value and directly precedes one character encoding value that references a letter or a number in the character table; and
the character encoding value that references the space directly precedes one word encoding value and directly follows one character encoding value that references a letter or a number in the character table.

12. One or more computer-readable media comprising computer-executable instructions that, when executed, perform the method as recited in claim 9.

13. A client device comprising:
a processor; and
a memory configured to maintain:
compressed electronic program guide (EPG) data that includes a plurality of word encoding values and a plurality of character encoding values, the EPG data being compressed by:
generating a compression table by examining the EPG data to recognize common sets of characters, the compression table being used to assign the plurality of character encoding values to represent each common set of characters;
analyzing the EPG data to create a word table that includes words having a predetermined number of letters, wherein words having the predetermined number of letters are represented by the plurality of word encoding values; and
reducing a number of character encoding values in the EPG data, the reducing including using one of a plurality of spacing rules to remove character encoding values that identify spaces in the compressed EPG data, and using one of a plurality of capitalization rules to limit a number of character encoding values such that separate encoding values are not needed to represent capital letters; and
an EPG application that is executable on the processor to:
apply at least one of the capitalization rules and the spacing rules to a word obtained from the compressed EPG data that is based on an arrangement of one word encoding value that references the obtained word with respect to at least one of:
one or more of the character encoding values; and
one other word encoding value;
wherein each capitalization rule specifies capitalizing a first character included in the obtained word based upon a condition selected from the group consisting of:
if the word encoding value that references the obtained word in the compressed EPG data immediately follows one character encoding value in the compressed EPG data that indicates an end of a sentence or an end of a previous data string; and
if the word encoding value that references the obtained word in the compressed EPG data is ordered as a first encoding value in a compressed data string included in the compressed EPG data;
wherein the spacing rule is selected from the group consisting of:
a first spacing rule that specifies if the word encoding value that references the obtained word directly follows another word encoding value, then a single space is inserted between the obtained word and a word referenced by the other word encoding value;
a second spacing rule that specifies if the word encoding value that references the obtained word directly precedes one character encoding value that references a letter or a number, then a space is inserted after the obtained word; and
a third spacing rule that specifies if the word encoding value that references the obtained word directly follows one character encoding value in the EPG data that references a letter or a number, then a space is inserted before the obtained word;
output the obtained word to which at least one of the capitalization rule and the spacing rule was applied.

14. A client device as described in claim 13, further comprising a tuner for receiving the compressed EPG data that is broadcast over a broadcast network.

15. A client device comprising:
a processor; and
a memory configured to maintain:
compressed electronic program guide (EPG) data that includes a plurality of word encoding values and a plurality of character encoding values, the EPG data being compressed by:
generating a compression table by examining the EPG data to recognize common sets of characters, the compression table being used to assign the plurality of character encoding values to represent each common set of characters;
analyzing the EPG data to create a word table that includes words having a predetermined number of letters, wherein words having the predetermined number of letters are represented by the plurality of word encoding values; and
reducing a number of character encoding values in the EPG data, the reducing including using one of a plurality of spacing rules to remove character encoding values that identify spaces in the compressed EPG data, and using one of a plurality of capitalization rules to limit a number of character encoding values such that separate encoding values are not needed to represent capital letters;
a word table including one or more words and one or more word encoding values, each word is referenced by one word encoding value;
a character table including one or more characters and one or more character encoding values, wherein each character encoding value references one or more of the characters; and
an EPG application that is executable on the processor to decompress the compressed electronic program guide (EPG) data by:
comparing one or more of the plurality of word encoding values with the one or more word encoding values in the table to find a match, and for each match, obtaining the word referenced by the matching word encoding value from the table;
applying at least one of the capitalization rules and the spacing rules to the obtained word that is based on an arrangement, in the compressed EPG data, of one word encoding value that references the obtained word with respect to at least one of:
one or more of the character encoding values; and
one other word encoding value; and
outputting the obtained word to which at least one of the capitalization rule and the spacing rule was applied.

16. A client device as described in claim 15, wherein each capitalization rule specifies capitalizing a first character included in the obtained word based upon a condition selected from the group consisting of:
if the word encoding value that references the obtained word in the compressed EPG data immediately follows one character encoding value in the compressed EPG data that indicates an end of a sentence or an end of a previous data string; and
if the word encoding value that references the obtained word in the compressed EPG data is ordered as a first encoding value in a compressed data string included in the compressed EPG data.

17. A client device as described in claim 15, wherein the spacing rule is selected from the group consisting of:
a first spacing rule that specifies if the word encoding value that references the obtained word in the compressed EPG data directly follows another word encoding value in the compressed EPG data, then a single space is inserted between the obtained word and a word referenced by the other word encoding value;
a second spacing rule that specifies if the word encoding value that references the obtained word in the compressed EPG data directly precedes one character encoding value in the compressed EPG data that references a letter or a number, then a space is inserted after the obtained word; and
a third spacing rule that specifies if word encoding value that references the obtained word in the compressed EPG data directly follows one character encoding value in the compressed EPG data that references a letter or a number, then a space is inserted before the obtained word.

18. A client device as described in claim 15, further comprising a tuner for receiving the compressed EPG data that is broadcast over a broadcast network.

19. An electronic program guide (EPG) server comprising:
a processor; and
a memory configured to maintain:
EPG data that includes a plurality of television programs, each television program having one or more television program characteristics, each television program characteristic having a value, each value having one or more characters, the EPG data being compressed and decompressed prior to being stored in the memory, the EPG data being compressed using:
a character compression technique that generates a compression table by examining the EPG data to recognize common sets of characters, the compression table being used to assign a plurality of character encoding values to represent each common set of characters;
a word compression technique that analyzes the EPG data to create a word table that includes words having a predetermined number of letters, wherein words having the predetermined number of letters are represented by a plurality of word encoding values; and
spacing and capitalization rules to reduce a number of character encoding values in the EPG data in which one of the spacing rules includes removing character encoding values that identify spaces in the compressed EPG data, and one of the capitalization rules includes limiting a number of character encoding values such that separate encoding values are not needed to represent capital letters;
a word table including one or more words and one or more of the word encoding values, each word encoding value referencing one word;
a character table including one or more characters and one or more of the character encoding values, wherein each character encoding value references one or more of the characters in the character table; and
an EPG application that is executable on the processor to:
compare the one or more characters of each value with the one or more words in the word table to find a match, and for each match, replacing the matching one or more characters of each value with the word encoding value in the word table that references the matching word;

compare the one or more characters of each value that do not match any of the words in the word table with the one or more characters in the character table to find a match, and for each match, replacing the matching one or more characters of each value with the character encoding value in the character table that references the matching one or more characters; and apply one or more of the spacing rules to the EPG data that are based on an arrangement of each word encoding value with respect to at least one of:
one character encoding value; and
one other word encoding value.

20. An EPG server as described in claim 19, wherein the EPG application is executable on the processor to output the EPG data to which the spacing rule was applied.

21. An EPG server as described in claim 19, wherein each spacing rule specifies removal of each character encoding value from the EPG data that references a space based upon a condition selected from the group consisting of:
the character encoding value that references the space is disposed directly between two word encoding values;
the character encoding value that references the space directly follows one word encoding value and directly precedes one character encoding value that references a letter or a number in the character table; and
the character encoding value that references the space directly precedes one word encoding value and directly follows one character encoding value that references a letter or a number in the character table.

22. An EPG server as described in claim 21, wherein the EPG server further comprises a broadcast transmitter that is configured to broadcast the EPG data to which the one or more spacing rules were applied over a broadcast network.

* * * * *